United States Patent [19]
Fukasawa

[11] Patent Number: 6,094,737
[45] Date of Patent: Jul. 25, 2000

[54] PATH TEST SIGNAL GENERATOR AND CHECKER FOR USE IN A DIGITAL TRANSMISSION SYSTEM USING A HIGHER ORDER VIRTUAL CONTAINER VC-4-XC IN STM-N FRAMES

[75] Inventor: Akihiko Fukasawa, Tokyo, Japan

[73] Assignee: Oki Electric Industry Co., Ltd., Tokyo, Japan

[21] Appl. No.: 08/985,958

[22] Filed: Dec. 5, 1997

[30] Foreign Application Priority Data

Dec. 20, 1996 [JP] Japan ................................ 8-341298

[51] Int. Cl.[7] .................................................. G01R 31/28
[52] U.S. Cl. .......................... 714/738; 714/724; 714/744
[58] Field of Search ................................ 714/738, 744, 714/724

[56] References Cited

U.S. PATENT DOCUMENTS 5,455,832  10/1995  Bowmaster .............................. 714/712

FOREIGN PATENT DOCUMENTS

| 0 443 029 A1 | 8/1991 | European Pat. Off. . |
| 0 743 770 A1 | 11/1996 | European Pat. Off. . |
| 2-140031 | 5/1990 | Japan . |
| 4-4631 | 1/1992 | Japan . |
| 7-118697 | 12/1995 | Japan . |

OTHER PUBLICATIONS

"Specification of Measuring Equipment: Digital test patterns for Performance Measurements on digital transmission equipment". ITU CCITTT Recommendation 0.150, Oct. 1992, pp. 1–5.

J.C. Newell, "High Speed psuedo–random binary sequence generation for testing and data scrambling in gigabit optical transmission systems", IEE Colloquium on 'Gigabit Logic Circuits' (Digest No. 075), London UK, Apr. 3, 1992, pp. 1/1–4.

"3.4 D/D Converter Circuits", Digital Communication Circuits, pp. 133–135, Noriyoshi Kuroyanagi.

International Telecommunication Union, "General Aspects of Digital Transmissions Systems—Network Node Interface for the Synchronous Digital Herarchy (SDH): ITU–T Recommendation G.707 (Draft)", Jul. 1995.

International Telecommunication Union, "Specifications of Measuring Equipment—Digital Test Patterns for Performance Measurements on Digital Transmission Equipment: Recommendation 0.150", Oct. 1992.

International Telecommunication Union, Annex 3—Draft Recommendation O.SDH "Equipment to Assess Error Performance on STM–N SDH Interfaces", pp. 22–43, Oct. 1993.

DooWhan Choi, "Parallel Scrambling Techniques for Digital Multiplexers" *AT&T Technical Journal*, vol. 65, issue 5, pp. 123–135 (Sep./Oct. 1986).

*Primary Examiner*—Phung M. Chung
*Attorney, Agent, or Firm*—Rabin & Champagne, PC

[57] ABSTRACT

A path test signal generator and checker which can achieve a path test by effectively generating a path test signal in a system handling synchronous transport modules STM-Ns with an order higher than that of the basic interface. A test pattern generator generates a continuous PN pattern intermittently, inserts a predetermined logical value in locations of the section overhead and path overhead in a transmission frame while suspending the generation of the path test signal in those locations, and inserts the continuous PN pattern in the entire columns of the payload of the transmission frame. A path overhead insertion circuit rewrites the predetermined logical value inserted in the location of the path overhead into the path overhead. The multiplex section terminating circuit rewrites the predetermined logical value inserted in the location of the MSOH (multiplex section overhead) to the MSOH, and the logical value inserted in the location of the RSOH (regenerator section overhead) to the RSOH. This ensures to achieve the effective path test by generating the synchronous transport module STM-N which accommodates in the entire columns of its payload the continuous path test signal in the form of PN pattern.

23 Claims, 11 Drawing Sheets

Fig. 6

| Fig. 7 |
|--------|
| Fig. 8 |

Fig. 10

PATH TEST SIGNAL GENERATOR AND CHECKER FOR USE IN A DIGITAL TRANSMISSION SYSTEM USING A HIGHER ORDER VIRTUAL CONTAINER VC-4-XC IN STM-N FRAMES

BACKGROUND OF THE INVENTION

1. Field of the Invention

The present invention relates to a path test signal generator and a path test signal checker for use in a digital transmission system and a synchronous transmission system, and more specifically to a path test signal generator and a path test signal checker for use in a digital transmission system and a synchronous transmission system preferably applied to a network such as B-ISDN (Broadband Integrated Services Digital Network) or SONET (Synchronous Optical NETwork).

2. Description of the Background Art

Recently, digital networks having fast and large transmission capacity, such as B-ISDN or SONET, have been developed and put into practice as the transmission capacity increases and the standardization of interfaces is internationally promoted with the development of digital telecommunications techniques. With fundamental technology supporting such digital networks, synchronous digital hierarchy standardizing the network node interface in general aspects of digital transmission systems are being promulgated, such as ITU-T (International Telecommunications Union-Telecommunications standardization sector) draft Recommendation G.707 (July, 1995).

The synchronous digital hierarchy, adopting transmission frames with a rate of 155.52 Mbps, that is, so-called synchronous transport module level-1 (STM-1) frames as basic interface, is a synchronous multiplexing scheme that multiplexes primary to quaternary group rate information different from nation to nation into frames with a rate of internationally standardized one. More specifically, four or three pieces of the primary group rate information with a rate of 1.5 Mbps or 2 Mbps are multiplexed to the secondary group information with a rate of 6 Mbps. Seven or 21 pieces of the secondory group rate information are multiplexed to the tertiary group rate information with a rate of 50 Mbps or to the quaternary rate information with a rate of 150 Mbps. Three pieces of the tertiary group rate information are multiplexed and provided with a header of a certain format, and are assembled into a transmission frame with a format according to the synchronous transport module STM-1. On the other hand, the 150 Mbps quaternary group rate information is provided with a header and accommodated into a transmission frame of the synchronous transport module STM-1.

The synchronous transport module STM-1 has a header with 9 rows by 9 columns in terms of bytes, and a payload with 9 rows by 261 columns in terms of bytes for accommodating information, thus having 9 rows by 270 columns. The header includes in the first to third rows a regenerator section overhead (RSOH) representing management information about a regenerator section, in the fourth row an AU (Administrative Unit) pointer which indicates the start point of the payload and aligns an asynchronism, and in the fifth to ninth rows a multiplex section overhead (MSOH) for representing management information on multiple sections.

In the quaternary group rate, the information accommodated in the payload of the synchronous transport module STM-1 consists of a path overhead (POH) in the first row, and substantial information accommodated in the remaining 260 columns. On the other hand, in the tertiary group rate, the information consists of three blocks of information, each block including 87 columns of information with the path overhead placed in the first row. The columns are each byte-interleaved to form the 261-column payload in the STM-1. In the foregoing cases, the payloads including path overheads POHs are called virtual containers VC-3 and VC-4, and the substantial information portions excluding the path overheads POHs are referred to as containers C-3 and C-4, respectively. In addition, the virtual containers VC-3 and VC-4 plus the AU pointers are called administrative units AU-3 and AU-4, respectively.

Likewise, in the primary and secondary groups, portions including only substantial information are called containers C11, C-12 and C-2 in ascending order of the rate, and those portions plus the headers are referred to as virtual containers VC-11, VC-12 and VC-2. Furthermore, the virtual containers plus TU (tributary unit) pointers similar to the AU pointers are called tributary units TU-11, TU-12 and TU-2. Those tributary units which are multiplexed after byte-interleaving are called tributary unit groups TUG-2 and TUG-3. The tributary unit groups TUG-2 and TUG-3, when multiplexed in such a manner that they are byte-interleaved and provided with path overheads POHS, constitute virtual containers VC-3 and VC-4, respectively.

The synchronous transport module STM-1 is bit-serially read in the row direction from the first bit in the first column to the final bit in the ninth row, and transmitted over a channel in 125 microseconds, thereby forming a transmitted frame with a rate of 155.52 Mbps. In a transmission system based on the synchronous digital hierarchy, each node, that is, each transmission equipment performs its transmission using transmission frames based on the synchronous transmission module STM-1, and in particular in a large capacity channel, it carries out its transmission using transmission frames based on synchronous transport module STM-N formed by byte-interleaving the synchronous transport module STM-1, where N is the n-th power of two, and n is an even integer including zero. The synchronous transport module STM-N includes a 9-row by (9×N)-column section overhead SOH and a 9-row by (261×N)-column payload, and has a standardized transmission rate of 620 Mbps when N=4, 1.8 Gbps when N=12 (applied only to submarine cables), 2.4 Gbps when N=16, and 9.9 Gbps when N=64. Thus, the transmission rate takes a value of integer multiple N of the basic interface.

As a path test method for such a digital transmission system, digital test patterns are defined in CCITT (The International Telegraph and Telephone Consultative Committee, now called ITU-T) Recommendation 0.150 (1992.10) for the tests of the digital transmission equipment with various transmission rates. For example, a 15th order PN (pseudo-random) test patterns are assigned to the test at 1.5 Mbps, 2 Mbps, 6 Mbps, 8 Mbps, 32 Mbps and 44 Mbps. The 15th order PN pattern is an M (maximum length) sequence pattern with a length of $(2^{15}-1)=32,767$ bits, which is generated by a 15-stage shift register whose 14th and 15th stage outputs are added in a modulo-two addition stage, and the result is fed back to the input of the first stage of the shift register. In this case, a maximum of 15 consecutive 1's can appear.

Besides, the 23rd order PN patterns are as signed to the tests at the rate of 34 Mbps and 139 Mbps. The 23rd order PN pattern is an M sequence pattern with a length of $(2^{23}-1)=8,388,607$ bits, which is generated by a 23-stage shift register whose 18th and 23rd stage outputs are added in a modulo-two stage, and the result is fed back to the first stage of the shift register. In this case, a maximum of 23 consecutive 1's can appear.

In the foregoing cases, rate sequences of the existing hierarchy are also included: In the synchronous digital hierarchy, the 15th order PN patterns are assigned to the 1.5 Mbps container C-11, 2.0 Mbps container C-12, 6 Mbps container C-2, and 44 Mbps container C-3, and the 23rd order PN patterns are assigned to the 34 Mbps container C-3 and 139 Mbps container C-4. As an example applying such PN patterns, ITU Recommendation O.SDH Annex 3 (October, 1993) defines a test signal structure of the synchronous digital hierarchy.

This document discloses a test signal structure, in which the 23rd order PRBS (Pseudo Random Binary Sequence) test pattern according to Recommendation 0.150 is inserted into the containers C-3 and C-4 except for the section overhead SOH and path overhead POH of the synchronous transport module. Likewise, test signal structures are disclosed, in which the PRBS test patterns according to Recommendation 0.150 are inserted into the containers C-11, C12 and C-2 which are multiplexed to the synchronous transport module. In addition, test signal structures are disclosed, in which the 23rd PRBS test patterns according to Recommendation 0.150 are inserted into all the STM-N frame bytes except for the regenerator section overhead RSOH of the synchronous transport module.

As a circuit for checking such PN patterns, PN pattern detectors are disclosed in Japanese patent laid-open publication No. 2-140031 (1990), Japanese patent publication No. 7-118697 (1995) and Japanese patent laid-open publication No. 4-4631 (1992).

The first publication, No. 2-140031 (1990), discloses a PN pattern detector which comprises a shift register for shifting an input pattern, a PN pattern generator for generating a PN pattern, a comparator for comparing their outputs, and a detector for detecting a maximum consecutive 0's of the PN pattern, and which shortens the acquisition time for pulling into synchronism by shifting the value of the shift register on the detected result, thereby carrying out error detection by comparing the acquisition patterns by the comparator. It is one of the serial self-synchronous PN pattern checkers which independently establishes synchronization at a receiving side without synchronizing with a transmitting side.

The second publication, No. 7-118697 (1995), discloses a serial self-synchronous PN pattern checker as in the first document. It includes a first n-stage shift register for shifting an input pattern, a PN pattern generator including a second n-stage shift register for generating a PN pattern, and a comparator for comparing those PN patterns, wherein one of n 2-1 selectors is connected to each input of the second n-stage shift register in the PN pattern generator for selecting either the output of its preceding stage or the output of the corresponding stage of the first n-stage shift register so that the first n-stage shift register is pulled in independently of the PN pattern generator, and the values of the first n-stage shift register are fed to the second n-stage shift register in a single clock in the pulled-in state, thereby making error detection by comparing their outputs.

The third publication, No. 4-4631 (1992), discloses a parallel self-synchronous PN pattern checker including a serial-to-parallel converter for converting a serial input pattern into a parallel pattern, a PN pattern generator for generating a PN pattern, a converter for converting its output, a comparator for comparing its output with the input pattern converted into parallel form, and a decision circuit for deciding the establishment of the synchronization.

The foregoing prior art references, however, disclose only common generation and detection of the PN pattern, but do not disclose a system that can implement the path test in the digital transmission system to which the synchronous digital hierarchy is applied. For example, it is necessary to contrive an insertion method of the PN pattern into the individual container C of the synchronous transport module according to ITU Recommendation O.SDH Annex 3, a detection method thereof, and a circuit configuration for implementing these methods.

In particular, although ITU Recommendation O.SDH Annex 3 discloses up to the test signal structure of the containers C-11, C-12, C-2, C-3 and C-4, it remains a future task to construct the test signal in the transmission frame including container C-4-Xc formed by linking the container C-4, where Xc is the n-th power of 2, and n is an even number including zero. Moreover, Recommendation 0.150 defines only the test patterns at a rate of 139 Mbps corresponding to the container C-4, without disclosing any test patterns corresponding to the container C-4-Xc faster than the container C-4.

This presents a further problem in that although a circuit for generating and detecting the test patterns for the container C-4-Xc is developed and applied to the transmission equipment, the equipment will become bulky and expensive because the circuit operating at a rate of several times 150 Mbps is difficult to implement using the state of the art LSI technology.

SUMMARY OF THE INVENTION

It is therefore an object of the present invention to provide a path test signal generator and a path test signal checker in a digital transmission system and synchronous transmission equipment which can solve the foregoing problems involved in the prior art, and implement the path test of the transmission frame including a higher-order container C-4-Xc by architecting a system capable of effectively inserting test patterns into the synchronous transport module.

Another object of the present invention is to provide a path test signal generator and a path test signal checker in the digital transmission system and synchronous transport equipment which can implement the path test of the transmission frames including higher-order C-4-Xc containers with a small and inexpensive equipment.

According to a first aspect of the present invention, there is provided a digital transmission system for transmitting between transmission equipment transmission frames with an order higher than that of a transmission frame of a basic interface of a synchronous digital hierarchy, the digital transmission system comprising at least in transmitting side transmission equipment: a first pointer processing circuit for processing a pointer indicating a start position of a virtual container accommodated in each transmission frame in response to an intra-equipment clock signal and a receiving clock signal; a first intra-equipment frame counter for detecting a position of each transmission frame in the equipment in response to the intra-equipment clock signal, and for sending out a control signal indicating that position; a test pattern generating circuit for generating a maximum length sequence pseudo-random (PN) pattern as a test pattern, and for inserting the test pattern in a predetermined position of the transmission frame in response to the control signal fed from the intra-equipment frame counter; a path overhead generating circuit for generating a path overhead that manages a path, and for inserting the path overhead into a predetermined position in the transmission frame, into which the test pattern has been inserted, in response to the control signal fed from the intra-equipment frame counter; and a section overhead generating circuit for generating a section overhead that manages a section, and for inserting the section overhead into a position of the transmission frame, into which the test pattern and the path overhead have been inserted, in response to the control signal fed from the intra-equipment frame counter, wherein the test pattern generating circuit, generating the continuous test pattern intermittently, inserts the continuous test pattern into each row of at least a payload of the virtual container accommodated in the transmission frame, and inserts a predetermined logical value into predetermined intervals where the generation of the test signal is suspended, and wherein the path overhead generating circuit and section overhead generating circuit assemble the transmission frame with a predetermined format by overwriting overheads on the intervals in which the predetermined logical value has been inserted by the test pattern generating circuit.

Here, the digital transmission system may advantageously further comprise at least in receiving side transmission equipment: a section overhead processing circuit for receiving the transmission frame from a channel, and for detecting the section overhead of the transmission frame to perform predetermined processing on the section overhead; a second pointer processing circuit for relocating synchronization of the transmission frame from a receiving clock signal to an intra-equipment clock signal by replacing the pointer of the transmission frame received through the section overhead processing circuit; a second intra-equipment frame counter for detecting a position of each transmission frame in the equipment in response to the intra-equipment clock signal, and for sending out a control signal indicating the position of the each transmission frame; a path overhead monitoring circuit for detecting the path overhead of the each transmission frame fed through the second pointer processing circuit, and for monitoring a content of the path overhead; and a test pattern check circuit for detecting a test pattern of the transmission frame fed through the second pointer processing circuit in response to the control signal from the intra-equipment frame counter, and for checking the test pattern whether it includes a transmission error, wherein the test pattern check circuit may intermittently generate, in response to the control signal fed from the intra-equipment frame counter, a continuous test pattern corresponding to the test pattern generated by the test pattern generating circuit, and may check a transmission error at least of the payload in the virtual container accommodated in the received transmission frame by comparing the payload with the continuous test pattern generated by the test pattern check circuit.

The transmitting side transmission equipment may advantageously comprise a first parallel-to-serial converting circuit for converting the transmission frame which has been processed in byte parallel into a bit-serial transmission frame to be transmitted, and the receiving side transmission equipment may advantageously comprise a first serial-to-parallel converting circuit for converting the bit serial transmission frame to a byte-parallel transmission frame to be processed in byte parallel.

The basic interface may be a transmission frame of a synchronous transport module level 1 with a rate of 155.52 Mbps, and the higher order transmission frame may be a transmission frame with a rate of an n-th power of two times the rate of the synchronous transport module level 1, where n is an even integer including zero, the higher order transmission frame accommodating a container C-4-Xc with an order higher than at least that of a fourth order container C-4, where Xc is an n-th power of 2, wherein the transmitting side transmission equipment may generate a virtual container VC-4-Xc for a test including the container C-4-Xc into which the continuous test pattern is inserted, the virtual container VC-4-Xc being generated by the test pattern generating circuit and the path overhead generating circuit, and wherein the receiving side transmission system may detect entire transmission errors of the virtual container VC-4-Xc for the test by the path overhead monitoring circuit and the test pattern check circuit.

The virtual container VC-4-Xc may include a 9-row by 1-column path overhead and 9-row by (Xc−1)column fixed stuff and a 9-row by 260Xc-column payload, and the test pattern generating circuit may suspend generation of the test pattern at least at positions of the path overhead and fixed stuff and may insert the predetermined logical value into the positions, and the path overhead generating circuit may generate the path overhead including the fixed stuff, and insert them in the positions, into which the predetermined logical value has been inserted, by overwriting the path overhead and fixed stuff.

The digital transmission system may comprise at least in the transmitting side transmission equipment a plurality of path test signal generators each including the first pointer processing circuit, the first intra-equipment frame counter, the test pattern generating circuit and the path overhead generating circuit, and each of the path test signal generators, operating at a clock frequency equal to or lower than that of the basic interface, may generate the virtual container VC-4-Xc for the test by multiplexing, with byte interleaving, virtual containers including containers into which the test patterns fed from the path test signal generators are inserted.

The digital transmission system may comprise at least in the receiving side transmission equipment a plurality of path test signal checkers each including the second pointer processing circuit, the second intra-equipment frame counter, the path overhead monitoring circuit and the test pattern check circuit, and each of the path test signal checkers, operating at a clock frequency equal to or lower than that of the basic interface, may process the path test signal obtained by dividing the virtual container VC-4-Xc fed from a channel by demultiplexing it.

The digital transmission system may comprise in each the transmission equipment a plurality of path test circuits, each of which includes the first and second intra-equipment frame counters, the test pattern generating circuit, the path overhead generating circuit, the first and second pointer processing circuit, the path overhead monitoring circuit and the test pattern check circuit, and may process the virtual container VC-4-Xc including the container C-4-Xc, into which the test pattern is inserted, while operating at a clock frequency equal to or lower than that of the basic interface.

The transmitting side transmission equipment may comprise a second parallel-to-serial converting circuit for converting the transmission frame which has been processed in byte parallel into a bit-serial transmission frame to be transmitted, and a multiplexing circuit for multiplexing signals output from the second parallel-to-serial converting circuit, and the receiving side transmission equipment may comprise a demultiplexing circuit for dividing the transmission frame transmitted in bit serial into a plurality of frames, and a second serial-to-parallel converting circuit for converting the divided frames to byte-parallel frames to be processed in byte parallel In a second aspect of the present invention, there is provided a path test signal generator in synchronous transmission equipment, which inserts, when generating and transmitting a transmission frame with an order higher than that of a transmission frame of a basic interface in a synchronous digital hierarchy, a path test signal into a container accommodated in the transmission frame, the path test signal generator comprising: an intra-equipment frame counter for detecting a position of each transmission frame in the equipment in response to the intra-equipment clock, and for sending out a control signal indicating that position; test pattern generating means for generating a maximum length sequence pseudo-random (PN) pattern as a test pattern, and for inserting the test pattern in a predetermined position of the each transmission frame in response to the control signal fed from the intra-equipment frame counter; and path overhead generating means for generating a path overhead that manages a path, and for inserting the path overhead into a predetermined position in the transmission frame, into which the test pattern has been inserted, in response to the control signal fed from the intra-equipment frame counter.

The test pattern generating means may generate a continuous test pattern intermittently, insert a predetermined logical value in intervals in the transmission frame during which the generation of the test pattern is suspended, and insert the continuous test pattern in each row of at least a payload of a virtual container accommodated in the transmission frame.

The path overhead generating means may advantageously rewrite the path overhead by overwriting it in the intervals in which the predetermined logical value has been inserted by the test pattern generating means.

The virtual container may consist of a higher order virtual container VC-4-Xc formed by concatenating a plurality of fourth order group virtual containers VC-4, where Xc is the n-th power of two, and n is an even number including zero, and the virtual container VC-4-Xc may include a 9-row by 1-column path overhead, 9-row by (Xc−1)-column fixed stuff, and a 9-row by 260Xc-column payload.

The test pattern generating means may suspend generating the test pattern at least at positions of the path overhead and fixed stuff, and may insert a predetermined logical value in those positions as provisional path overhead and fixed stuff, and the path overhead generating means may generate the path overhead and fixed stuff, and overwrite the path overhead and fixed stuff in the positions into which the provisional path overhead and fixed stuff have been inserted.

The test pattern generating means may include one of a reset type serial PN pattern generator, a serial self-synchronous PN pattern generator, and a reset type parallel PN pattern generator.

According to a third aspect of the present invention, there is provided a path test signal checker in synchronous transmission equipment, which receives through a channel a transmission frame with an order higher than that of a transmission frame of a basic interface of a synchronous digital hierarchy, and checks a path test signal inserted into a virtual container of the transmission frame, the path test signal checker comprising: pointer processing means for relocating synchronization of the transmission frame from a receiving clock signal to an intra-equipment clock signal by replacing a pointer of the received transmission frame; an intra-equipment frame counter for detecting a position of each transmission frame in the equipment in response to the intra-equipment clock signal, and for sending out a control signal indicating that position; path overhead monitoring means for monitoring a content of a path overhead by detecting the path overhead of the transmission frame fed through the pointer processing means in response to the control signal from the intra-equipment frame counter; and test pattern check means for checking a transmission error of a test pattern by detecting the test pattern of the transmission frame fed through the pointer processing means in response to the control signal from the intra-equipment frame counter.

The test pattern check means may intermittently generate, in response to the control signal delivered from the intra-equipment frame counter, a continuous test pattern corresponding to the test pattern inserted in predetermined portions of the transmission frame, and may check transmission errors at least of a payload of the virtual container accommodated in the received transmission frame in accordance with the test pattern generated by the test pattern check means.

The virtual container may consist of a higher order virtual container VC-4-Xc formed by concatenating a plurality of fourth order group virtual containers VC-4, where Xc is the n-th power of two, and n is an even number including zero, and the virtual container VC-4-Xc may include a 9-row by 1-column path overhead, 9-row by (Xc−1)-column fixed stuff, and a 9-row by 260Xc-column payload.

The path overhead monitoring means may detect the path overhead and the fixed stuff, and carry out error detection of them.

The test pattern check means may include a serial self-synchronous PN pattern check circuit for serially generating a maximum length sequence PN pattern, and check the test pattern.

The test pattern check means may include a parallel self-synchronous PN pattern checking circuit for generating in parallel a maximum length sequence PN pattern, and check the test pattern.

BRIEF DESCRIPTION OF THE DRAWINGS

The objects and features of the present invention will become more apparent from consideration of the following detailed description taken in conjunction with the accompanying drawings in which:

FIG. 6 shows how

FIGS. 7 and 8, when combined as shown in FIG. 6, show, in a schematic block diagram, transmitting side transmission equipment of an alternative embodiment of the digital transmission system in accordance with the present invention;

FIG. 10 illustrates, like FIG. 4, an example of the path test signal applied to the alternative embodiment.

DESCRIPTION OF THE PREFERRED EMBODIMENTS

Figure 1:
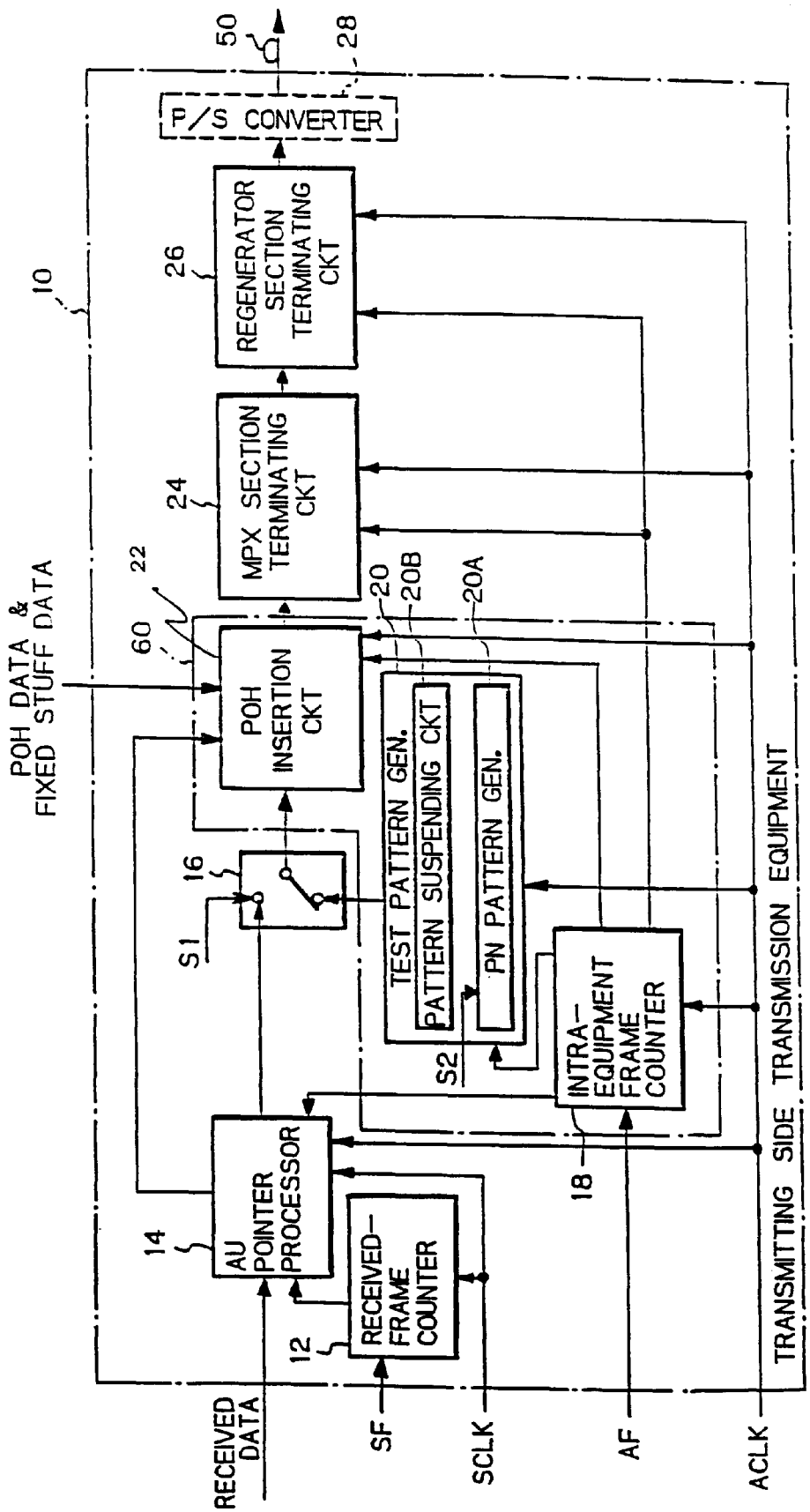
FIG. 1 is a schematic block diagram showing transmitting side transmission equipment of a preferred embodiment of a digital transmission system in accordance with the present invention.
Figure 2:
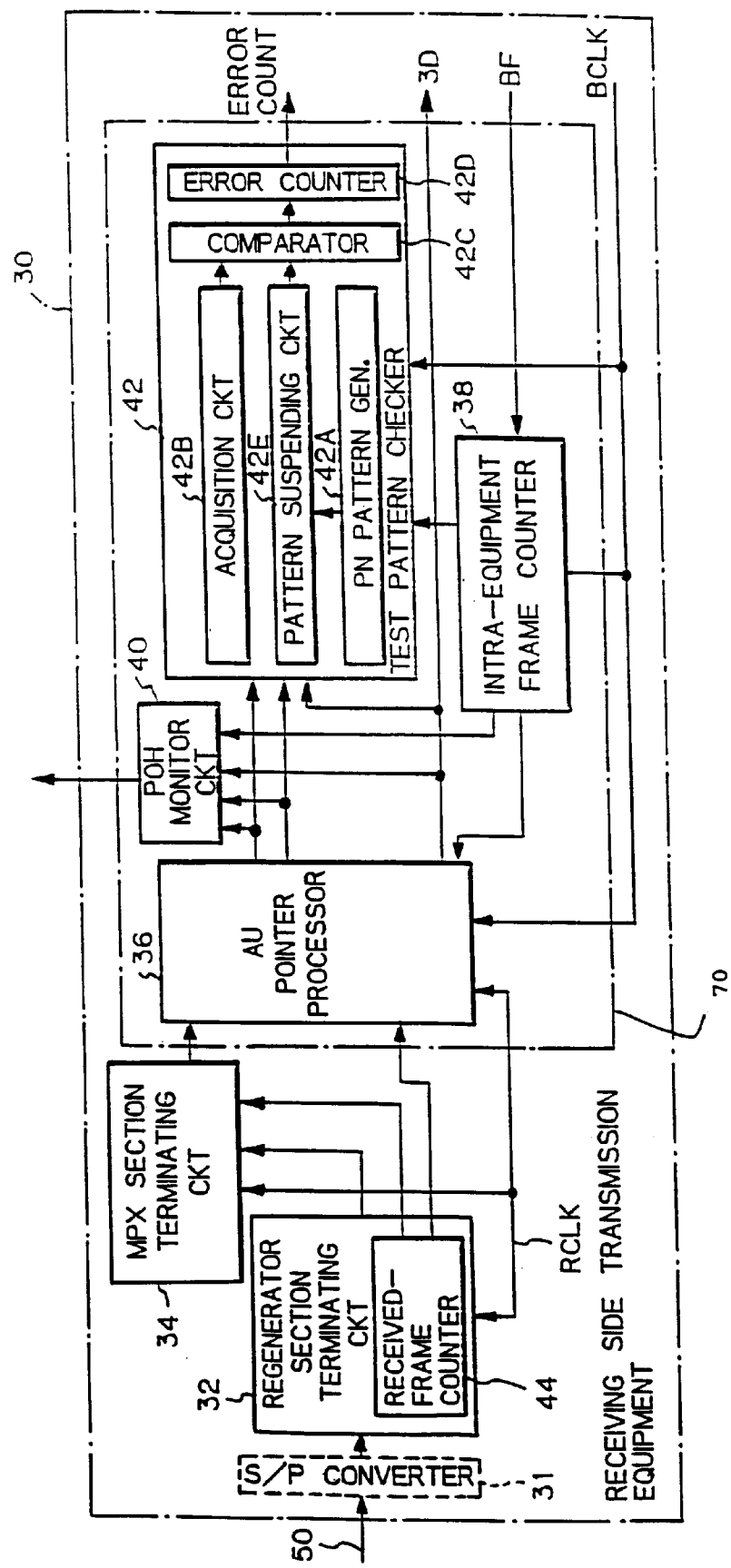
FIG. 2 is a schematic block diagram showing receiving side transmission equipment of the preferred embodiment of the digital transmission system in accordance with the present invention.

The invention will now be described with reference to the accompanying drawings. Referring to FIGS. 1 and 2, showing a preferred embodiment of a digital transmission system in accordance with the present invention, the digital transmission system is adapted to transmit a digital signal multiplexed according to the SDH (Synchronous Digital Hierarchy) by accommodating it in STM-N (Synchronous Transport Module-level N) frames in a digital network such as B-ISDN (BroadBand Integrated Services Digital Network). It includes a transmitting side transmission equipment 10 as shown in FIG. 1, receiving side transmission equipment 30 as shown in FIG. 2, and a fast, large transmission capacity channel 50 interconnecting the equipment.

Figure 3:
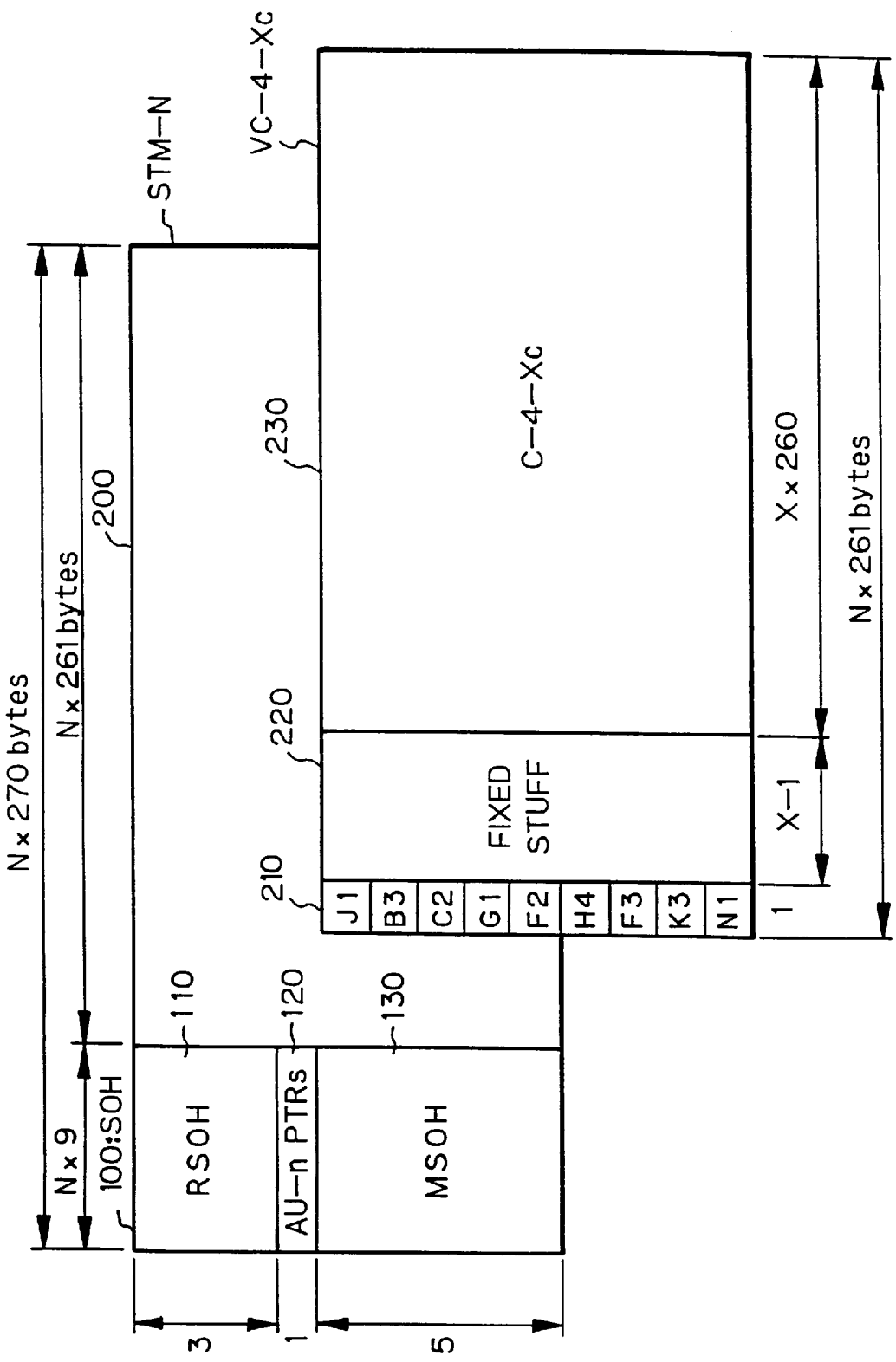
FIG. 3 illustrates a synchronous transport module STM-N applied to the illustrative embodiment as shown in FIGS. 1 and 2.

The synchronous transport module STM-N consists of N transmission frames based on basic interface of 155.52 Mbps, where N is the n-th power of 2, and n is an even integer including zero, and includes a 9-row by N×9-column section (in terms of byte) overhead (SOH) 100, and a 9-row by N×261-column payload 200 as shown in FIG. 3. The section overhead 100 includes from the first to third rows regenerator section overheads (RSOH) 110 representing the management and operation information about the regenerator system, at the four row administrative unit pointers (AU-n PTRs) 120, and from the fifth to ninth rows multiplex section overheads (MSOH) 130 representing the management and operation information about the multiplexing system.

The payload 200 accommodates virtual container VC-4-Xc including a container (C-4-Xc) 230 containing X times the fourth order group container C-4, where X is the n-th power of 2. The first column of the virtual container VC-4-Xc is used for a path overhead (POH) 210 which represents the management information about the path. From the second to X-th column, (x−1)-column fixed stuff 220 is inserted for adjusting the speed. The fixed stuff is filled with a predetermined logic value when multiplexing X fourth order group containers C-4, each with nine rows by 260 columns.

In the following description of the present embodiment, a digital transmission system will be described when N=16 as an example. In this case, the transmission system assembles and transmits a transmission frame accommodating the virtual container VC-4-16c in the synchronous transport module STM-16 with a rate of 2488.32 Mbps, 16 times the basic interface rate of 155.52 Mbps. Incidentally, in FIGS. 1 and 2, only portions having immediate connection with the present invention will be described in detail, omitting the other portions.

The transmitting side transmission equipment 10 is a transmission device in a regenerator terminal, for example, which receives the synchronous transport module STM-16 from an exchange or multiplexing system not shown in this figure, and transmits it to the channel 50 after arranging it to a predetermined form. In particular, the transmitting side transmission equipment 10 of the present embodiment includes a path test signal generator 60 for inserting a path test signal into the synchronous transport module STM-16 in the form of the virtual container VC-4-16c.

More specifically, the transmitting side transmission equipment 10 comprises a received-frame counter 12, an AU pointer processor 14, a switching circuit 16, an intra-equipment frame counter 18, a test pattern generator 20, a path overhead insertion circuit 22, a multiplex section terminating circuit 24, and a regenerator section terminating circuit 26, wherein the intra-equipment frame counter 18, test pattern generator 20, and path overhead insertion circuit 22 constitute the path test signal generator 60 of the present embodiment.

The received-frame counter 12 and AU pointer processor 14 each receive a receiving clock signal SCLK of 2488.32 MHz synchronized with a received frame SF in the form of the synchronous transport module STM-16. At the same time, the AU pointer processor 14, intra-equipment frame counter 18, test pattern generator 20, path overhead insertion circuit 22, multiplex section terminating circuit 24 and regenerator section terminating circuit 26 receive an intra-equipment clock signal ACLK of 2488.32 MHz synchronized with a transmission frame AF in the form of the synchronous transport module STM-16 in the system.

More specifically, the received-frame counter 12 counts the bits of the received transmission frame on the basis of the receiving clock signal SCLK, and detects the position of each transmission frame, thereby outputting its result. It includes a binary counter with its full count of 34,560 adapted for counting the 34,560 bits corresponding to the number of each row of the synchronous transport module STM-16, another binary counter with its full count of 1,152 adapted for counting the bits of each row of the section overhead SOH, and a further binary counter with its full count of 33,408 adapted for counting the bits of each row of the payload. In particular, the counter having its full count of 34,560 is adapted to count three cycles, or three rows of the transmission frame from its beginning to the initial position of the AU pointer at the fourth row, and supplies its result, or count, to the AU pointer processor 14.

The AU pointer processor 14 extracts the AU pointer from the received frame in accordance with the detection signal fed from the received-frame counter 12, and generates the AU pointer of a newly formed transmission frame by decoding the contents of the AU pointer. It typically includes a pointer buffer for storing the extracted AU pointer, a decoder for decoding its contents, and a pointer generator for generating the new AU pointer.

More specifically, the AU pointer includes H1 and H2 bytes indicating the head address of the virtual container VC-4-16c in the transmission frame STM-16, and H3 byte for adjusting the loss of alignment of the virtual container VC-4-16c. Since the position of the virtual container VC-4-16c in the received transmission frame may differ from that in the newly formed transmission frame owing to the frequency difference between the receiving clock signal SCLK and intra-equipment clock signal ACLK, and to the transmission delay, it is necessary to relocate the H1, H2 and H3 bytes by correctly generating them in response to the receiving clock signal SCLK and intra-equipment clock signal ACLK.

The path overhead insertion circuit 22, which usually receives the generated AU pointer, attaches it to the virtual container VC-4-16c to form the administrative unit AU-4-16c. In this embodiment, the initial position of the virtual container VC-4-16c is aligned with that of the payload 200 of the synchronous transport module STM-16 by setting the pointer value to a predetermined value, zero, for example, when sending the path test signal. In addition, the AU pointer processor 14, receiving the payload of the received frame as the received data, supplies it to the switching circuit 16 as intra-equipment data by relocating it on the alignment based on the intra-equipment clock signal ACLK.

The switching circuit 16 selectively switches between the intra-equipment data fed through the AU pointer processor 14 and the path test data fed from the channel 50 in response to a first control signal S1. The first control signal S1 is normally kept off to select the intra-equipment data, and is turned on when carrying out the path test as shown in FIG. 1.

The intra-equipment frame counter 18 detects the positions of the transmission frames in the equipment in response to the intra-equipment clock signal ACLK, and sends out a control signal indicating the positions. This control signal is delivered to the AU pointer processor 14, test pattern generator 20 and path overhead insertion circuit 22.

In particular, the intra-equipment frame counter 18 supplies, when testing the path, the AU pointer processor 14 with the control signal commanding the generation of the pointer value which enables the AU pointer processor 14 to generate the path test signal at the initial position of the transmission frame. In addition, the intra-equipment frame counter 18 detects the positions such as those of the section overhead, AU pointer, path overhead, and fixed stuff of the transmission frame by a plurality of counters like a binary counter having its full count of 1,152, a binary counter having its full count of 33,408, and a binary counter having its full count of 34,560, as in the received-frame counter 12, and supplies them to the test pattern generator 20.

The test pattern generator 20 generates a test pattern in response to the control signal fed from the intra-equipment frame counter 18 and the intra-equipment clock signal ACLK. It includes a PN pattern generator 20A for generating a PN (Pseudo-random Noise) pattern of M (Maximum-length) sequence as the test pattern. In particular, the test pattern generator 20 is a transmission frame constructing circuit which carries out mapping of the entire bits of the synchronous transport module STM-16, and assigns the continuous PN pattern at least to the payload of the transmission frame, that is, to the respective columns of the container C-4-16c accommodated in the virtual container VC-4-16c.

More specifically, the PN pattern generator 20A is preferably a reset type serial PN pattern generator including, for example, a 23-stage shift register; an adder for carrying out modulo-two addition of the 18th and 23rd stage outputs of the shift register, and for feeding the addition result back to the input of the first stage; a reset circuit for resetting the value of the shift register to a particular value other than zero in response to the reset signal S2; and gate elements such as inhibition gates for disabling the output of the shift register in response to the frame alignment code.

The test pattern generator 20 further includes a pattern suspending circuit 20B for inhibiting the output of the PN pattern for particular intervals. The pattern suspending circuit 20B is provided for preventing the PN pattern from being inserted into the entire portion of the synchronous transport module STM-16, thereby making it possible to generate the path test signal of the present embodiment. The pattern suspending circuit 20B includes a latch circuit and a selector at the output of a gate element to hold predetermined logical value "1" or "0" at the particular intervals. For example, it selects consecutive logical "1" or "0" in the intervals of the section overhead SOH and the path overhead POH, and the fixed stuff if necessary, to select and output the PN pattern from the gate element in the interval of the container C-4-16c. This is carried out in response to a control signal fed from the intra-equipment frame counter 18. The output of the test pattern generator 20 is supplied to the path overhead insertion circuit 22 through the switching circuit 16.

The path overhead insertion circuit 22 is a header generator for generating the path overhead POH of the virtual container VC-4-16c, and attaching it to a predetermined position of the transmission frame in accordance with the AU pointer from the AU pointer processor 14. The path overhead POH includes, as shown in FIG. 3, a path trace J1 byte, B3 byte including BIP-8 (Bit interleaved Parity-8) for computing parity of bits in each column for monitoring error, C2 byte including a code for identifying path information, G1 byte used for notifying of the error of transmission state, path user channels F2 and F3, position indicator H4 byte, K3 byte including an APS (Automatic Protection Switching) channel (b1–b4) and spare bits (b5–b8), and network operator byte N1 used for communications between terminals.

The path overhead insertion circuit 22 extracts them as needed, or extracts without change the bytes attached up to the previous stage, and adds them to the first column of the virtual container VC-4-16c. In particular, this embodiment includes an operating circuit for calculating the BIP-8 of the PN pattern from the test pattern generator 20. In addition, since the pointer value is zero during the path test in this embodiment, the path overhead POH is inserted by overwriting it on the tenth column of the transmission frame in the equipment, that is, on the position into which a predetermined logical value is mapped by the test pattern generator 20. Likewise, the fixed stuff is overwritten to be inserted in the transmission frame from the second to 16-th column thereof, if necessary. The transmission frame, to which the test pattern, path overhead POH and fixed stuff are inserted, is supplied to the multiplex section terminating circuit 24.

The multiplex section terminating circuit 24 is a transmitting side terminating circuit of a multiplex section of the transmission channel 50 for generating a multiplex section overhead MSOH consisting of the network operation and management information of the multiplex section on the channel 50, and adds it to the real information. It is added to the transmission frame of the synchronous transport module STM-16 from its 5th to 9th row over (9×16) columns in response to the control signal from the intra-equipment frame counter 18. The multiplex section overhead MSOH includes, for example, a plurality of B2 bytes including BIP-24×n obtained by computing parity for every 24 bits or N times the 24 bits for monitoring the section error; K1 byte for controlling the switching system; K2 byte used for transferring the multiplex section status like an alarm signal; D4–D12 bytes used for data communications of the multiplex section; and a plurality of Z2 bytes for notifying of the multiplex error status. In this embodiment, the multiplex section overhead MSOH is overwritten to be inserted into the position in which the predetermined consecutive logical value has been mapped by the test pattern generator 20. The transmission frame, into which the multiplex section overhead MSOH is inserted, is supplied to the regenerator section terminating circuit 26.

The regenerator section terminating circuit 26 is a transmitting side terminating circuit of a regenerator or repeater section of the transmission channel 50 for generating a regenerator section overhead RSOH consisting of the network operation and management information of the regenerator section on the channel 50, and adds it to the transmission frame. It is added to the transmission frame from its first to third row over 9×16 columns in response to the control signal from the intra-equipment frame counter 18. The regenerator section overhead RSOH includes A1 and A2 bytes including the frame alignment code; a C1 byte for representing the identification number of the synchronous transport modules STM-1s when they are multiplexed to the synchronous transport module STM-16; B1 byte including BIP-8 for monitoring the regenerator section error; F1 byte into which a fault identification code of the regenerator section is to be inserted; and D1–D3 bytes used for data communications of the regenerator section. In this embodiment, the regenerator section overhead RSOH is inserted by overwriting it on the location in which a consecutive predetermined logical value has been mapped by the test pattern generator 20 during the path test. The transmission frame, into which the regenerator section overhead RSOH is inserted, is formed into a complete synchronous transport module STM-16 and is sent to the channel 50.

On the other hand, the receiving side transmission equipment 30 is a transmission device of a regenerator terminal, for example, which receives the synchronous transport module STM-16 transmitted from the transmitting side transmission equipment 10 through the channel 50, and transmits it to an exchange or multiplex system. In particular, it includes a path test signal checker 70 for checking the path test signal in the virtual container VC-4-16c accommodated in the received synchronous transport module STM-16 in this embodiment.

More specifically with reference to FIG. 2, the receiving side transmission equipment 30 of the present embodiment includes, for example, a regenerator section terminating circuit 32, multiplex section terminating circuit 34, AU pointer processor 36, intra-equipment frame counter 38, path overhead monitor circuit 40, and test pattern checker 42, wherein the AU pointer processor 36, intra-equipment frame counter 38, path overhead monitor circuit 40 and test pattern checker 42 constitute the path test signal checker 70.

In addition, the intra-equipment clock signal BCLK with a frequency of 2488.32 MHz is supplied to the AU pointer processor 36, intra-equipment frame counter 38, path overhead monitor circuit 40 and test pattern checker 42 in response to the intra-equipment frame BF as in the transmitting side transmission equipment 10.

The regenerator section terminating circuit 32 is a receiving side terminating circuit for terminating the regenerator, or repeater, section of the transmisson channel 50, which circuit is adapted to detect the regenerator section overhead RSOH from the synchronous transport module STM-16 fed through the channel 50. It includes a received-frame counter 44 like the received frame counter 12 in the transmitting side transmission equipment 10, and a clock regenerator that regenerates the receiving clock signal RCLK based on the frame alignment code included in the A1 and A2 bytes in the detected regenerator section overhead RSOH, and supplies the clock signal to the multiplex section terminating circuit 34 and AU pointer processor 36. The received-frame counter 44 detects the position of the multiplex section overhead MSOH and that of the AU pointer in the received frame using a plurality of counters such as counters with their full count of 1,152, 33,408 and 34,560, and supplies the detection result to the multiplex section terminating circuit 34 and AU pointer processor 36.

The multiplex section terminating circuit 34 detects the multiplex section overhead MSOH from the synchronous transport module STM-16 fed via the regenerator section terminating circuit 32, and terminates the multiplex section. The administrative unit AU-4-16c, which includes the AU pointer and the virtual container VC-4-16c obtained by removing the section overheads RSOH and MSOH from the transmission frame by the regenerator section terminating circuit 32 and multiplex section terminating circuit 34, is supplied to the AU pointer processor 36 from the multiplex section terminating circuit 34 as the received data.

The AU pointer processor 36 functions not only as a processor for detecting the AU pointer from the received data fed from the multiplex section terminating circuit 34 and processes the AU pointer, but also as an alignment converter for relocating the received data onto an intra-equipment frame in response to the receiving clock signal RCLK and intra-equipment clock signal BCLK, thereby transmitting it as the intra-equipment data BD. The AU pointer processor 36 detects the initial position of the virtual container VC-4-16c in the intra-equipment frame from the processed result of the AU pointer, that is, the initial position of the path overhead POH, and supplies the detection result to the path overhead monitor circuit 40 and test pattern checker 42. In addition, the virtual container VC-4-16c relocated onto the intra-equipment clock is supplied to the path overhead monitor circuit 40 and test pattern checker 42 as the intra-equipment data.

The intra-equipment frame counter 38 detects the position of each transmission frame in the equipment in response to the intra-equipment clock signal BCLK as in the transmitting side, and sends a control signal indicating the positions. It includes a plurality of counters such as counters having their full count of 1,152, 33,408 and 34,560. The control signals are supplied to the AU pointer processor 36, path overhead monitor circuit 40 and test pattern checker 42.

The path overhead monitor circuit 40 sequentially detects the path overhead POH from the intra-equipment data fed from the AU pointer processor 36 in response to the position signal from the AU pointer processor 36 and the control signal from the intra-equipment frame counter 38, and monitors the contents of the path overhead POH. It includes a decoder for decoding the contents of the path overhead POH on the basis of its bytes. In particular, it includes an operational circuit for deciding whether or not the parity bits represented by the BIP-8 are normal. The decoded path overhead POH is transferred along with the fixed stuff to the path overhead insertion circuit of the next transmitting side transmission equipment not shown in this figure.

The test pattern checker 42 detects a test pattern from the intra-equipment data fed from the AU pointer processor 36 in response to the control signal from the intra-equipment frame counter 38, and checks the test pattern whether or not it includes the transmission error. It includes a PN pattern generator 42A for generating a PN pattern similar to that generated by the test pattern generator 20 in the transmitting side, an acquisition circuit 42B for pulling in the test pattern in the intra-equipment data in synchronism with the generated PN pattern, a comparator 42C for comparing the test patterns, and an error counter 42D for counting the bit errors obtained as the results of the comparison.

As the test pattern checker 42, a serial self-synchronous PN pattern checker can be preferably employed which applies a scheme similar to the self-synchronous scheme described in the aforementioned Japanese patent laid-open publication No. 2-140031 (1990) and Japanese patent publication No. 7-118697 (1995). The test pattern checker 42, however, includes a pattern suspending circuit 42E for suspending the output of the PN pattern throughout the intervals of the section overhead SOH and path overhead POH, and fixed stuff if needed, so that only the test pattern inserted in the container C-4-16c is compared continuously.

The operation of this embodiment of the digital transmission system with the foregoing arrangement will now be described. First, the operation of the transmitting side transmission equipment 10 will be described. Receiving the receiving clock signal SCLK in response to the received frame, the received frame counter 12 detects the positions of the AU pointers by counting the receiving clock signal SCLK, and sequentially supplies the results to the AU pointer processor 14. The AU pointer processor 14 detects the AU pointers in the received frames to perform predetermined processing, and supplies the AU pointers to the path overhead insertion circuit 22. At the same time, the AU pointer processor 14, receiving the intra-equipment clock signal ACLK, relocates the virtual container VC-4-16c received as the received data onto the intra-equipment clock, and transfers them to the path overhead insertion circuit 22 as the intra-equipment data through the switching circuit 16.

Likewise, the intra-equipment frame counter 18 detects the position of the path overhead POH in each transmission frame by counting the intra-equipment clock signal ACLK in response to the intra-equipment frame, and supplies it to the path overhead insertion circuit 22. Thus, the path overhead insertion circuit 22, receiving the AU pointers from the AU pointer processor 14, sequentially inserts the path overheads POH into the positions in the transmission frame indicated by the AU pointers in response to the intra-equipment clock signal ACLK. In addition, the path overhead insertion circuit 22, receiving the real information in the virtual container VC-4-16c following the path overheads through the switching circuit 16, sequentially transfers them to the multiplex section terminating circuit 24.

The multiplex section terminating circuit 24, receiving the transmission frames, transfers the data therein from the first to fourth rows to the regenerator section terminating circuit 26 without change, and transfers also to the regenerator section terminating circuit 26 the data from the fifth to ninth rows after adding the multiplex section overhead MSOH to their first to 169th columns. The regenerator section terminating circuit 26, receiving the data, adds the regenerator section overhead RSOH over the first 169 columns of the first to third rows of each frame, and transfers the data to the channel 50. Thus, the transmission frames in the form of the synchronous transport module STM-16 accommodating the virtual containers VC-4-16 are sequentially transmitted.

When carrying out the path test in such a situation, the path test signal is generated to be inserted into one of several tens of frames, or is generated continuously at an abnormal occasion. First, to start the path test, the switching circuit 16 is connected to the output of the test pattern generator 20 by turning on the first control signal after the intra-equipment data in the previous transmission frame have been completely sent out through the AU pointer processor 14 through the switching circuit 16.

Next, the intra-equipment frame counter 18, counting the intra-equipment clock signal ACLK in the transmission frames up to the previous frame, supplies the AU pointer processor 14 with a control signal for starting the path test at the next intra-equipment frame when the counting approaches the final row in the previous frame. Thus, the AU pointer processor 14 generates the pointer value indicating the initial position of the virtual container VC-4-16c in the path test signal. On the other hand, the test pattern generator 20 is supplied with a reset signal so that the shift register in the PN pattern generator 20A is set at a value other than zero. Then, the intra-equipment frame counter 18, detecting the initial bit of the intra-equipment frame, supplies the control signal indicating the position of the bit to the AU pointer processor 14, test pattern generator 20 and regenerator section terminating circuit 26.

Thus, the AU pointer processor 14 sends the generated AU pointer to the path overhead insertion circuit 22. At the same time, the PN pattern generator 20A in the test pattern generator 20 starts to generate the PN pattern in response to the intra-equipment clock signal ACLK. In this embodiment, however, the test pattern generator 20 selects logical value "0", for example, and supplies it to the path overhead insertion circuit 22 through the switching circuit 16 until the next control signal is received by the pattern suspending circuit 20B.

Next, the intra-equipment frame counter 18 detects the position of the path overhead POH by counting the intra-equipment clock signal ACLK, and supplies the path overhead insertion circuit 22 with the control signal indicating that position. Then, the path overhead insertion circuit 22 inserts the J1 byte in the beginning of the first row of the virtual container VC-4-16c, to which the logical value "1" has been assigned. In this course, it also overwrites the fixed stuff from the second to 15-th column if needed.

Subsequently, detecting the bit next to the path overhead POH or the bit next to the fixed stuff, the intra-equipment frame counter 18 supplies the test pattern generator 20 with the control signal indicating the position of that bit. In response, the test pattern generator 20 has its pattern suspending circuit 20B select the PN pattern fed from the PN pattern generator 20A, and supplies it to the path overhead insertion circuit 22 through the switching circuit 16. Receiving the PN pattern, the path overhead insertion circuit 22 sequentially supplies the multiplex section terminating circuit 24 with the J1 byte, the fixed stuff and the PN pattern of the first row.

The multiplex section terminating circuit 24 transfers the data fed from the path overhead insertion circuit 22 to the regenerator section terminating circuit 26 without change because it does not insert the overhead in the first row. Subsequently, the regenerator section terminating circuit 26 overwrites, in response to the control signal from the intra-equipment frame counter 18, the regenerator section overhead RSOH of the first row from the beginning of the transmission frame to the 9×19-th column in which the logical value "0" has been inserted. Then, the regenerator section terminating circuit 26 successively transmits over the channel 50 the J1 byte of the path overhead POH, fixed stuff and PN pattern, which have been transferred thereto.

Subsequently, detecting the initial position of the second row by detecting the position of the final bits of the first row, the intra-equipment frame counter 18 supplies a control signal indicating that position to the test pattern generator 20, path overhead insertion circuit 22 and regenerator section terminating circuit 26 in the same manner as described above. Thus, the test pattern generator 20 suspends the generation of the PN pattern again, and continuously outputs the logical value "0" in response to the intra-equipment clock signal ACLK until it receives the next control signal. The output is sent as described above through the switching circuit 16 to the path overhead insertion circuit 22 which rewrites it to the B3 byte and fixed stuff of the second row at the position of the path overhead POH, and supplied it to the regenerator section terminating circuit 26 via the multiplex section terminating circuit 24. The regenerator section terminating circuit 26 rewrites it to the information of the second row at the position of the regenerator section overhead RSOH in the same manner as described above, and sequentially transmits it to the channel 50.

Afterward, when the intra-equipment frame counter 18 detects the bit next to the path overhead POH and fixed stuff again, the test pattern generator 20 switches its mode from the selection mode of the logical value "1" to the selection mode of the PN pattern, and sequentially outputs the PN pattern. Thus, the PN pattern is inserted into the position of the container C-4-16c in the payload of the transmission frame, and is fed to the channel 50 through the switching circuit 16, path overhead insertion circuit 22, multiplex section terminating circuit 24 and regenerator section terminating circuit 26 to be transmitted over the channel 50.

When the output of the second row of the transmission frame has been completed in this way, the third row is handled in the same manner: The test pattern generator 20 continuously outputs the logical value "0" from the first column to the end position of the path overhead POH or that of the fixed stuff if necessary, followed by outputting of the PN pattern from the PN pattern generator 20A. Receiving these data, the path overhead insertion circuit 22 inserts the byte of the path overhead POH of the third row and fixed stuff as needed in the same manner as described above. Afterward, the regenerator section terminating circuit 26 adds the regenerator section overhead RSOH, and supplies its output to the channel 50 to be transmitted.

Concerning the fourth row, the path overhead insertion circuit 22 first rewrites the logical value "0", which has been inserted by the test pattern generator 20 from the first to 916th column of the fourth row, into the AU pointer fed from the AU pointer processor 14, and then rewrites the path overhead POH at the next byte, followed by rewriting of the fixed stuff as needed. These data are supplied to the channel 50 along with the following PN pattern through the multiplex section terminating circuit 24 and regenerator section terminating circuit 26 to be transmitted.

Likewise, the multiplex section terminating circuit 24 sequentially rewrites the first to 9×16-th columns of the fifth to ninth row to the multiplex section overhead MSOH in response to the control signal from the intra-equipment frame counter 18, and the path overhead insertion circuit 22 rewrites the next byte and the successive 16 columns to the path overhead POH and fixed stuff. These data are supplied to the channel 50 along with the succeeding PN pattern through the regenerator section terminating circuit 26 to be transmitted.

Figure 4:
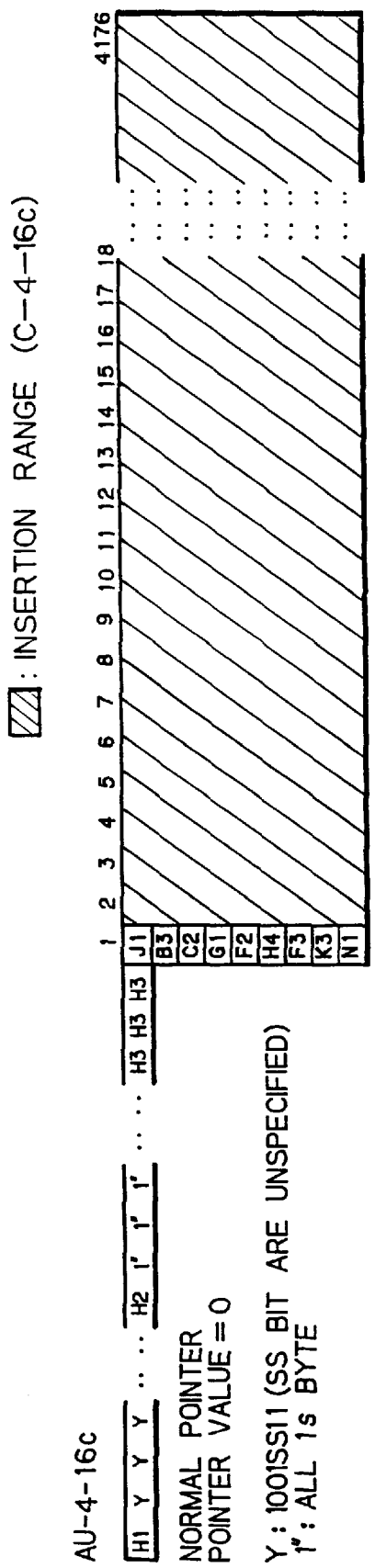
FIG. 4 illustrates an example of a path test signal applied to the illustrative embodiment.
Figure 5:
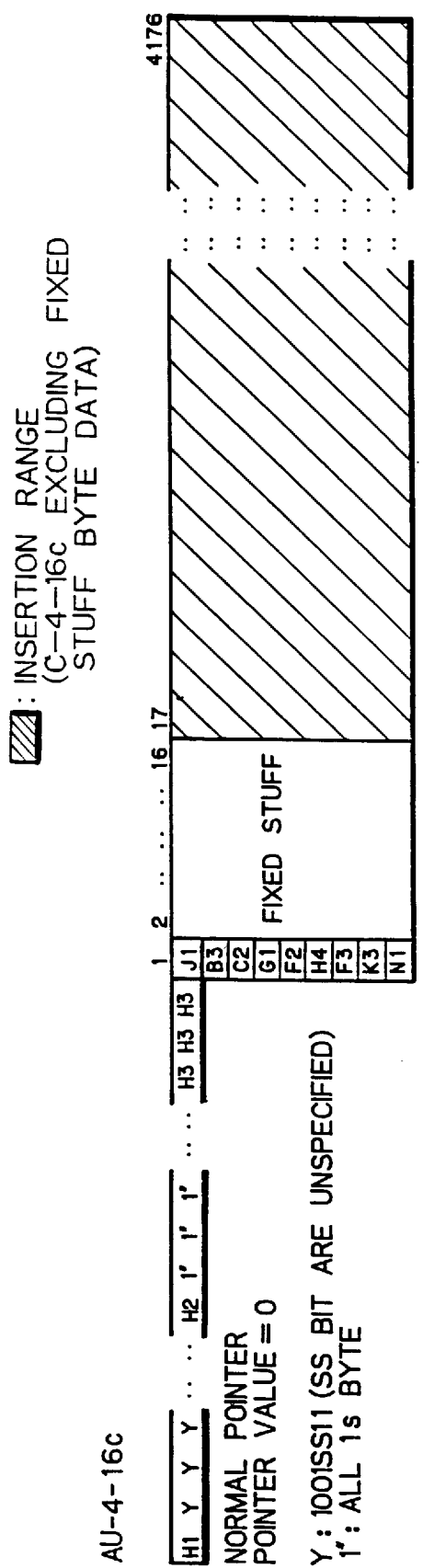
FIG. 5 illustrates, like FIG. 4, another example of the path test signal applied to the embodiment.

As a result, the virtual container VC-4-16c in the form of the path test signal is generated and accommodated in the synchronous transport module STM-16. Specifically, the virtual container VC-4-16c is generated in which the PN pattern is inserted continuously over the entire columns of its container C-4-16c as shown in FIG. 4, or the virtual container VC-4-16c is generated in which the PN pattern is inserted continuously in the entire columns of its container C-4-16c except for the fixed stuff as shown in FIG. 5, and they are transferred sequentially to the receiving side transmission equipment 30 via the channel 50. In these figures, a pointer value "0" is assigned to the H1 and H2 bytes in the AU pointer, and a value which does not indicate to carry out either the positive stuff nor the negative stuff is assigned to the H3 byte. A value representing concatenation, "1001SS11", for example, where bits SS are unspecified, is written in bytes Y following the H1 byte. The bytes following the H2 bytes are all "1".

At the receiving side transmission equipment 30, receiving from the channel 50 the synchronous transport module STM-16 including the path test signal, the regenerator section terminating circuit 32 sequentially extracts the regenerator section overhead RSOH from the first to third row of the received frame. At the same time, it regenerates the receiving clock signal RCLK by detecting the frame alignment code from the A1 and A2 bytes in the first row. The regenerated receiving clock signal RCLK is sequentially supplied to the multiplex section terminating circuit 34 and AU pointer processor 36.

On the other hand, upon receiving the receiving clock signal RCLK, the received-frame counter 44 detects the location of the AU pointer and that of the multiplex section overhead MSOH in the received frame by counting the receiving clock signal RCLK, and supplies the result to the AU pointer processor 36 and multiplex section terminating circuit 34.

The data from which regenerator section overhead RSOH has been removed is fed to the multiplex section terminating circuit 34 as the received data. The multiplex section terminating circuit 34 removes the multiplex section overhead MSOH in the fifth to ninth rows, and supplies the remaining data to the AU pointer processor 36.

Receiving the data, the AU pointer processor 36 extracts the AU pointer from the fourth row, and detects the initial position of the payload in the transmission frame, which is indicated by the AU pointer. In the course of this, the AU pointer processor 36 receives the intra-equipment clock signal BCLK, relocates the received data from the receiving clock signal RCLK to the intra-equipment clock signal BCLK to be output as the intra-equipment data, and generates a pointer indicating its location in the intra-equipment frame, thereby delivering the pointer to the path overhead monitor circuit 40 and test pattern checker 42.

The intra-equipment frame counter 38 counts the intra-equipment clock signal BCLK provided in response to the intra-equipment frame, and delivers a control signal indicating its location to the AU pointer processor 36, path overhead monitor circuit 40 and test pattern checker 42. In response to this, the path overhead monitor circuit 40 extracts from the intra-equipment data the path overhead POH and the fixed stuff, if it is present, row by row, and performs predetermined processings by decoding them. In particular, detecting the B3 byte including the BIP-8, the path overhead monitor circuit 40 detects whether or not the bits of the virtual container VC-4-16c are correct by carrying out parity calculation, and supplies the result to the monitor circuit or the like in the controller. Thus, the monitoring of the virtual container VC-4-16c by the path overhead POH in the received frame has been achieved.

The test pattern checker 42 checks the transmission error by detecting the test pattern in the intra-equipment data fed from the AU pointer processor 36 in response to the control signal from the intra-equipment frame counter 38. More specifically, receiving the control signal indicating the beginning of the intra-equipment frame from the intra-equipment frame counter 38, the test pattern checker 42 activates the PN pattern generator 42A to start the generation of the PN pattern like that of the transmitting side. During the generation, however, the pattern suspending circuit 42E suspends the output of the PN pattern in the intervals of the section overhead SOH, path overhead POH and the fixed stuff if it is present. Afterward, the intra-equipment frame counter 38 detects the initial position of the container C-4-16c in the transmission frame by counting the intra-equipment clock signal BCLK, and supplies the test pattern checker 42 with a control signal indicating that position.

The test pattern checker 42, receiving the AU pointer from the AU pointer processor 36 and then the control signal from the intra-equipment frame counter 38, identifies the test pattern in the remaining frame data by detecting the location of the J1 byte in the path overhead POH in accordance with the H1 and H2 bytes in the AU pointer. The acquisition circuit 42B in the test pattern checker 42 begins at first to pull in the test pattern which has become the intra-equipment data, thus transiting from the alignment guard state to the acquisition state. Then, the comparator 42C compares the test pattern with the generated PN pattern to detect the bit error of the test pattern. The bit errors detected are counted by the error counter 42D to be accumulated.

In this way, the test pattern checker 42 detects the bit errors of the test pattern from the first to ninth row by comparing by the comparator 42C the PN pattern with the test pattern in the interval of the container C-4-16c while suspending the generation of the PN pattern in the intervals of the section overhead SOH, path overhead POH, and the fixed stuff if needed, in response to the control signal from the intra-equipment frame counter 38. Detecting the bit errors of the transmission frame in this way, the test pattern checker 42 counts the detection result frame by frame, or day by day, and supplies it to the monitor circuit in the controller not shown in this figure as an error count value, thereby monitoring the path.

As described above, according to the embodiment of the digital transmission system, the transmitting side transmission equipment 10 is provided with the path test signal generator 60 for generating the PN pattern and for inserting it into the payload of the synchronous transport module STM-16, and the receiving side transmission equipment 30 is provided with the path test signal checker 70 for generating the PN pattern similar to that of the transmitting side, and for checking the bit errors by comparing it with the received test pattern. This enables the error of the transmission path to be detected and dealt with quickly.

In this case, since the path test signal generator 60 can freely suspend the generation of the PN pattern in predetermined intervals in response to the control signal from the intra-equipment frame counter 18, the continuous PN pattern can be effectively inserted into rows of the payload of the virtual container VC-4-16c accommodated in the synchronous transport module STM-16. Furthermore, since the predetermined logical value is continuously inserted into the locations into which the PN pattern is not inserted, the post-stage path overhead insertion circuit 22, multiplex section terminating circuit 24 and regenerator section terminating circuit 26 can easily and correctly add the headers similar to those in the common synchronous transport module STM-16.

Now, the receiving side transmission equipment 30 generates the continuous PN pattern intermittently as the path test signal generator 60, and compares it with the test pattern, it can correctly detect the bit errors. In addition, it can detect the transmission error of the path overhead POH using the B3 byte because the transmitting side generates and inserts the path overhead POH as in the normal case. Thus, the receiving side transmission equipment 30 can detect the transmission error throughout the entire bit stream of the virtual container VC-4-16c accommodated in the synchronous transport module STM-16, which makes it possible to achieve the effective path test.

Although the foregoing embodiment is described exemplifying the transmission of the synchronous transport module STM-16 with a rate of 16 times that of the basic interface as that of the synchronous transport module STM-N, the present invention is not limited to this, of course. For example, it can be applied to the transmission of the synchronous transport module STM-N, where N is an n-th power of two, and n is an even natural number including zero.

In addition, although the embodiment is an example in which all the component circuits are adapted to process the transmission frame in bit serial mode, they can process the transmission frame in parallel because each column of each transmission frame of the synchronous transport module STM-N consists of eight bits. This can be achieved by providing a parallel-to-serial converter 28 at the output of the regenerator section terminating circuit 26, and a serial-to-parallel converter 31 at the input of the regenerator section terminating circuit 32.

Furthermore, it is possible to employ, as the PN pattern generator 20A in the test pattern generator 20 of the transmitting side, a circuit similar to the reset type parallel PN pattern generator as described in an article, DooWhan Choi, "Parallel Scrambling Techniques for Digital Multiplexers" AT&T TECHNICAL JOURNAL, volume 65, issue 5, pages 123–135 (September/October 1986), and to employ, as the test pattern checker 42 of the receiving side, a circuit similar to the parallel self-synchronous PN pattern checker disclosed in Japanese patent laid-open publication No. 4-4631 (1992) mentioned before. However, they must be provided with the pattern suspending circuits for freely suspending the generation of the PN pattern to generate and check the path test signal of the embodiment effectively. Moreover, the component circuits can be allowed to operate at a frequency of ⅛ that of transmission frame of the synchronous transport module STM-N by reducing the receiving clock signals SCLK and RCLK and intra-equipment clock signals ACLK and BCLK by a factor of eight from the frequency of the transmission frame of the synchronous transport module STM-N. For example, they can operate at 311.04 MHz, a frequency of ⅛ of 2488.32 MHz which is the frequency of the synchronous transport module STM-16.

Figure 7:
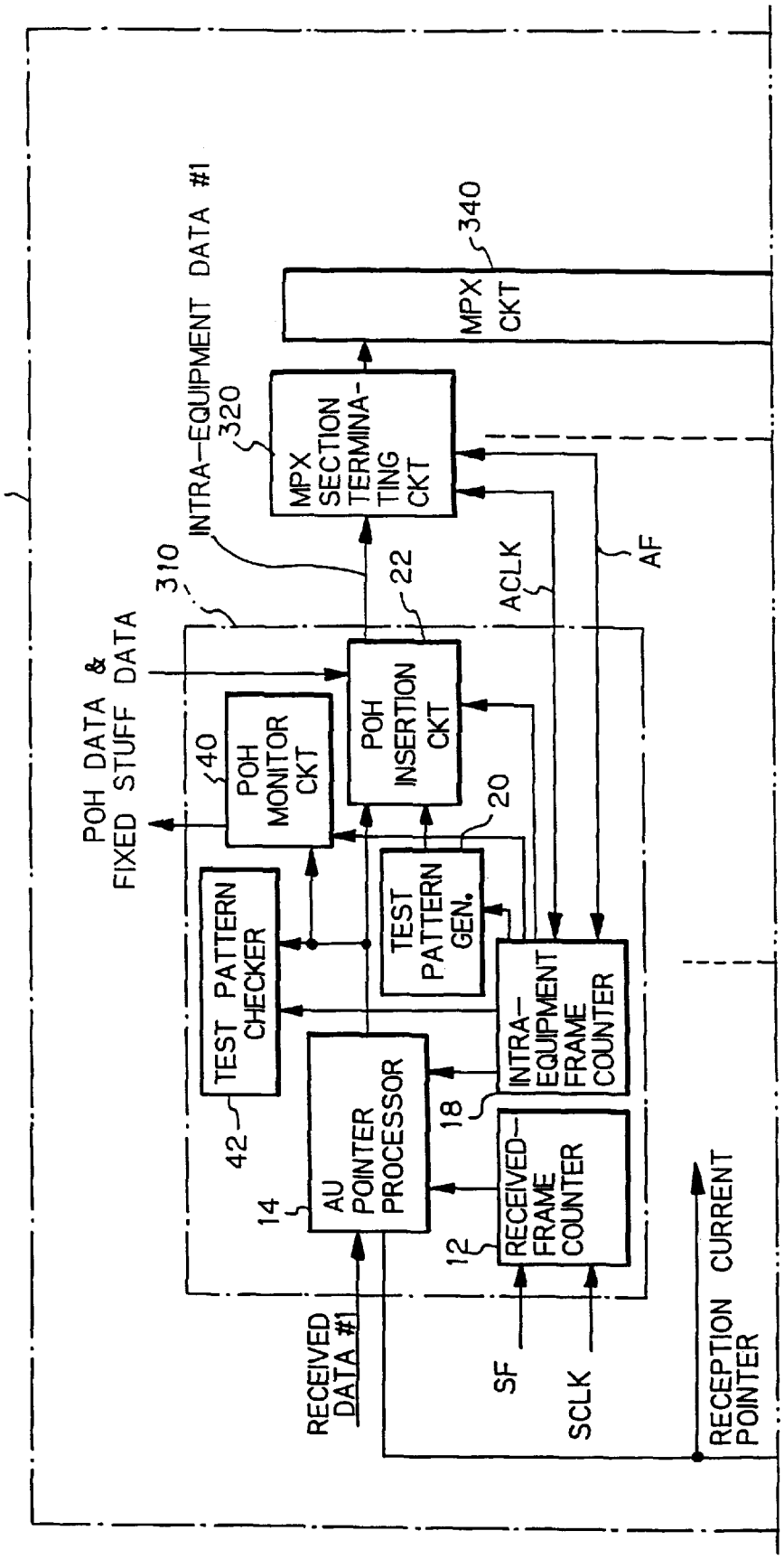
FIGS. 7 and 8 are combined.
Figure 8:
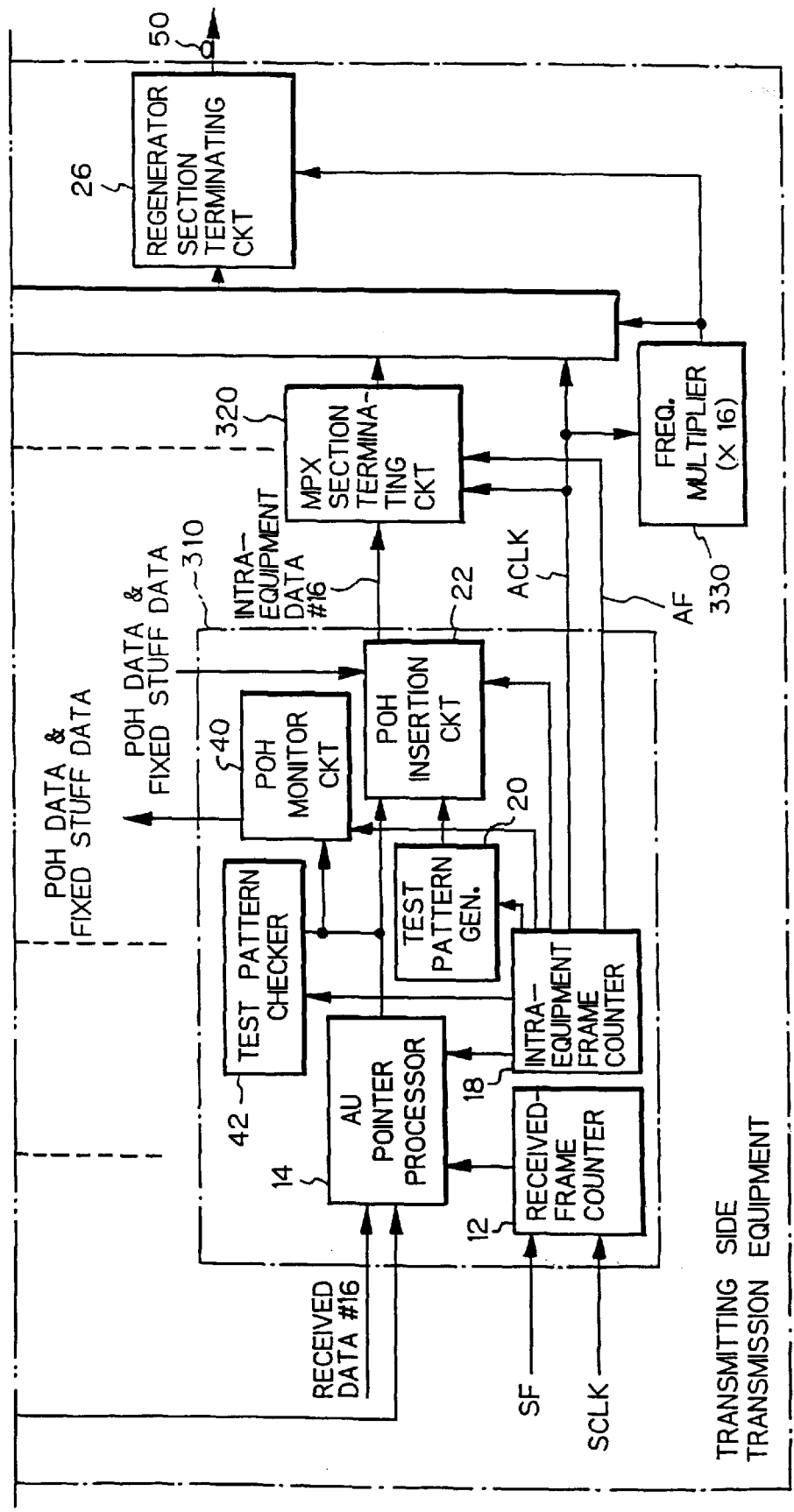

FIGS. 7 and 8 shows an alternative embodiment of the digital transmission system in accordance with the present invention. The two figures are combined as shown in FIG. 6. This embodiment of the digital transmission system is the same as the embodiment shown and described earlier except that it includes N frame processors in both the transmitting side and receiving side. Each frame processor processes a frame obtained by dividing the synchronous transport module STM-N into N frames. The frames processed by the frame processors are multiplexed with byte interleaving or demultiplexed with byte deinterleaving. In the following description of the alternative embodiment, the like portions to those of FIGS. 1 and 2 are designated by the same reference numerals, and the description thereof is omitted or simplified. Besides, the present embodiment also takes the synchronous transport module STM-16 as an example of the synchronous transport module STM-N as in the foregoing embodiment.

Figure 9:
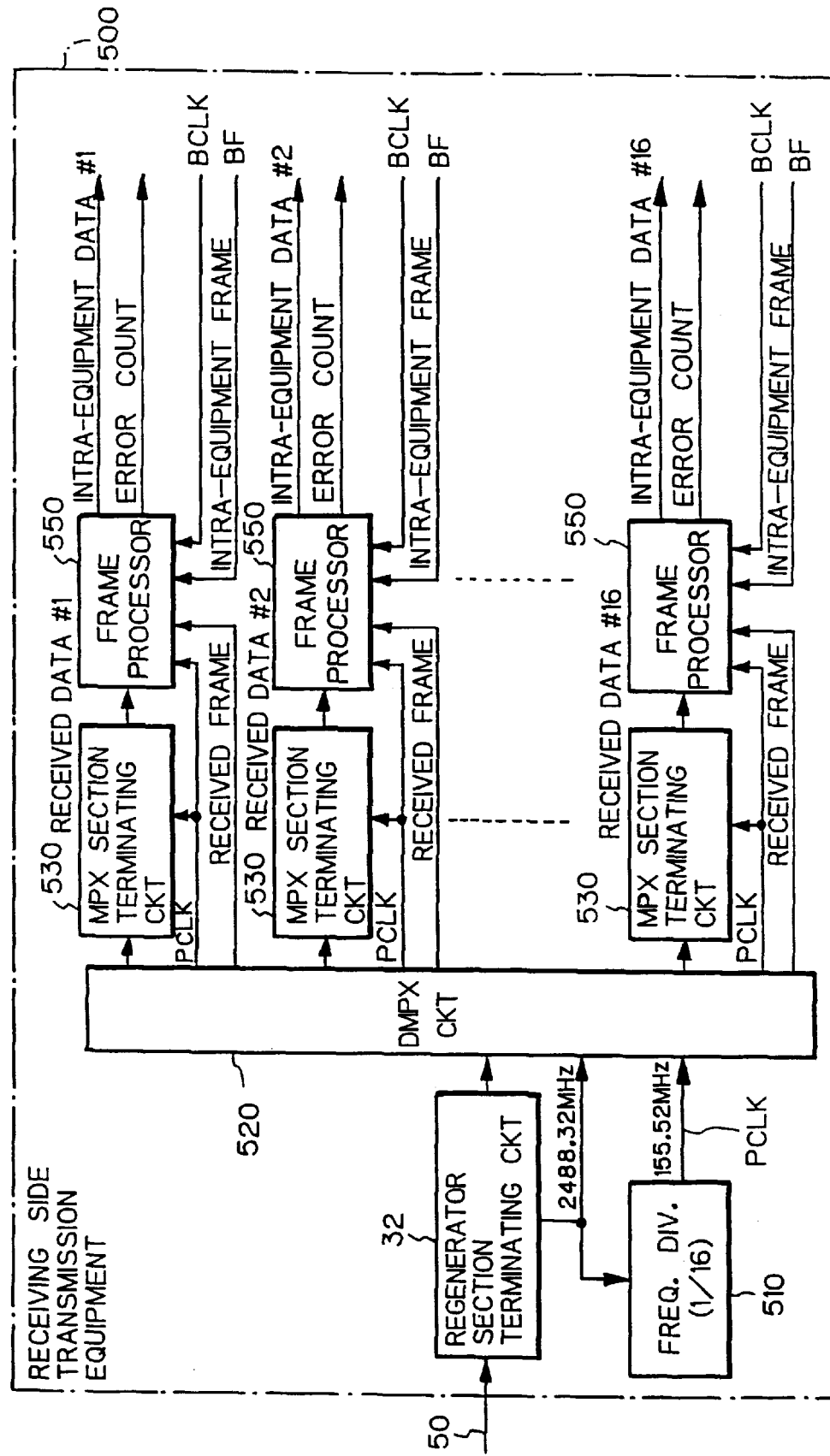
FIG. 9 is, like FIG. 2, a schematic block diagram showing receiving side transmission equipment of the alternative embodiment of the digital transmission system in accordance with the present invention.

The present embodiment of the digital transmission system comprises transmitting side transmission equipment 300 as shown in FIGS. 7 and 8, receiving side transmission equipment 500 as shown in FIG. 9 and the channel 50 interconnecting them. The transmitting side transmission equipment 300 and receiving side transmission equipment 500 include 16 frame processors 310 and 550, respectively. The frame processors 310 and 550 have a common structure which includes a path test signal generator and a path test signal checker like those of the first embodiment, and is integrated into an LSI (Large Scale Integrated circuit), forming path test circuitry.

More specifically, the transmitting side transmission equipment 300 includes, as shown in FIGS. 7 and 8, 16 frame processors 310, 310, . . . , 16 multiplex section terminating circuits 320, 320, . . . , a frequency multiplier 330, a multiplexer 340 and a regenerator section terminating circuit 26. Each frame processor 310 is adapted to receive the receiving clock signal SCLK and intra-equipment clock signal ACLK with a frequency of 155.52 MHz equal to that of the synchronous transport module STM-1 of the basic interface, and each multiplex section terminating circuit 320 shares the intra-equipment clock signal ACLK with the frame processor 310.

In particular, the frame processor 310 of the present, alternative embodiment includes the test pattern checker 42 and the path overhead monitor circuit 40 in addition to the received-frame counter 12, AU pointer processor 14, intra-equipment frame counter 18, test pattern generator 20 and path overhead insertion circuit 22 like those in the first embodiment. Those elements constitute a path test circuit including a path test signal generator and a path test signal checker. In the present embodiment, the switching circuit 16 is omitted, and the path overhead insertion circuit 22 is supplied with the output of the test pattern generator 20 directly only while the test pattern generator 20 is operating, but otherwise with the intra-equipment data from the AU pointer processor 14.

Each frame processor 310 assembles a frame similar to the administrative unit AU-4 formed by adding an AU pointer to the 9-row by 270-column virtual container VC-4, and forms a test path signal by continuously inserting the PN pattern into the entire rows of its container C-4 as in the first embodiment, thereby supplying the path test signal to the multiplex section terminating circuit 320 through the path overhead insertion circuit 22.

In particular, the AU pointer processor 14 in the first frame processor 310 generates as in the first embodiment the pointer whose value is "0" during the path test, and each AU pointer processor 14 in the remaining frame processors 310 generates a pointer representing the concatenation. The path overhead insertion circuit 22 in the first frame processor 310 generates the path overhead POH of the virtual container VC-4-16*c*, and that in each of the remaining frame processors 310 inserts the fixed stuff in the location of the path overhead POH if necessary. Unless the fixed stuff is inserted, the PN pattern is inserted from that location. In the present embodiment, each of the remaining frame processors 310 computes besides the first frame processor 310 the BIP-8 of at least the B3 byte in the path overhead POH, and the first frame processor 310 collects its result to compute the BIP-8 of the entire virtual container VC-4-16*c*, thereby inserting it into the B3 byte of the path overhead POH.

Each multiplex section terminating circuit 320 generates a 5-row by 9-column multiplex section overhead MSOH as in the synchronous transport module STM-1, and adds it to the fifth to ninth rows of a transmission frame fed from the frame processor 310.

The frequency multiplier 330, receiving the 155.52 MHz intra-equipment clock signal ACLK, increases its frequency by a factor of 16 to generate a clock signal of the synchronous transport module STM-16 with a frequency of 2488.32 MHz, and supplies it to the multiplexing circuit 340.

The multiplexing circuit 340, receiving the 9-row by 270-column transmission frames from each multiplex section terminating circuit 320, multiplexes them by byte-interleaving them on the column basis to form a 9-row by 270×16-column transmission frame according to the synchronous transport module STM-16, and supplies the multiplexed transmission frames to the regenerator section terminating circuit 26 in response to the 2488.32 MHz clock signal.

Now referring to FIG. 9, the receiving side transmission equipment 500 includes a frequency divider 510, a demultiplexer 520, 16 multiplex section terminating circuits 530, 530, . . . , and 16 frame processors 550, 550 . . . Each frame processor 550 is supplies with the 155.52 MHz intra-equipment clock signal BCLK like that in the transmitting side transmission equipment 300.

The regenerator section terminating circuit 32, receiving the synchronous transport module STM-16 from the channel 50, detects and removes the regenerator section overhead RSOH from its first to third rows, and supplies the demultiplexer 520 with the remaining data. In addition, it detects the frame alignment code from the A1 and A2 bytes to regenerate the 2488.32 MHz receiving clock signal, and supplies it to the frequency divider 510 and demultiplexer 520.

The frequency divider 510 divides the frequency of the regenerated receiving clock signal by 16 to generate the receiving clock signal PCLK with a frequency of 155.52 MHz, and supplies it to the multiplex section terminating circuits 530 and frame processors 550 through the demultiplexer 520.

The demultiplexer 520 is a deinterleaver for separating the 16 transmission frames by extracting them column by column from the transmission frame according to the synchronous transport module STM-16 fed from the regenerator section terminating circuit 32, and supplies them to the multiplex section terminating circuits 530 on the eight bit basis.

Each multiplex section terminating circuit 530 detects the multiplex section overhead MSOH from the fifth to ninth rows of each of the transmission frames separated by the demultiplexer 520. It further extracts the headers inserted at every 9-column interval and performs predetermined processing on them.

Each frame processor 550 includes a path test signal checker which extracts the path test signal from the received data fed through the corresponding multiplex section terminating circuit 530, and which has the same internal structure as the frame processor 310 in the transmitting side transmission equipment 300. It will be described in more detail referring to FIGS. 7 and 8. The AU pointer processor 14 in the frame processor 550 converts the received data fed from the multiplex section terminating circuit 530 (FIG. 9) into intra-equipment data synchronized with the intra-equipment clock signal BCLK in response to the control signals fed from the received frame counter 12 and intra-equipment frame counter 18, and outputs it with its new AU pointer replaced.

The path overhead monitor circuit 40, especially that of the first frame processor 550, extracts the path overhead POH in response to the AU pointer fed from the AU pointer processor 14 and the control signal fed from the intra-equipment frame counter 18, and processes it. In particular, it detects the B3 byte and computes its parity, and delivers the result to the monitoring circuit such as control circuitry.

The test pattern checker 42 detects bit errors of the test pattern inserted into the container C-4 on the basis of the control signal fed from the intra-equipment frame counter 18. If there are fixed stuffs in the second and the following transmission frames having been separated, the test pattern checker 42 detects together with the first to 16th frame processors 550 the 9-row by 260-column test pattern to carry out the checking. Unless the fixed stuff is present, the frame processors 550 other than the first frame processor 550 perform checking by detecting the 9-row by 261-column test pattern. The check results are counted by the error counters, and collected in every frame basis or day by day basis to be supplied to the monitoring circuit in the controller.

As described above, according to the instant, alternative embodiment of the digital transmission system, the transmitting side transmission equipment 300 inserts the continuous PN pattern into the entire rows of the transmission frames obtained by separating the synchronous transport module STM-16 into 16 parts, and assembles the transmission frame according to the synchronous transport module STM-16 into which the path test signal has been accommodated by multiplexing them with byte interleaving. This enables each frame processor 310 to operate in synchronism with the 155.52 MHz clock signal employed in the basic interface, and to be formed in an LSI, thus making it possible to implement small size, inexpensive transmission equipment.

Likewise, the demultiplexer 520 in the receiving side transmission equipment 500 divides the synchronous transport module STM-16 accommodating the path test signal into 16 transmission frames, and each of the 16 frame processors 550 processes one of the 16 transmission frames to check the test pattern. This also enables each of the frame processors 550 to operate at a speed substantially equal to or less than that of the basic interface, thus making it possible to construct a small size, low cost equipment.

Figure 10:
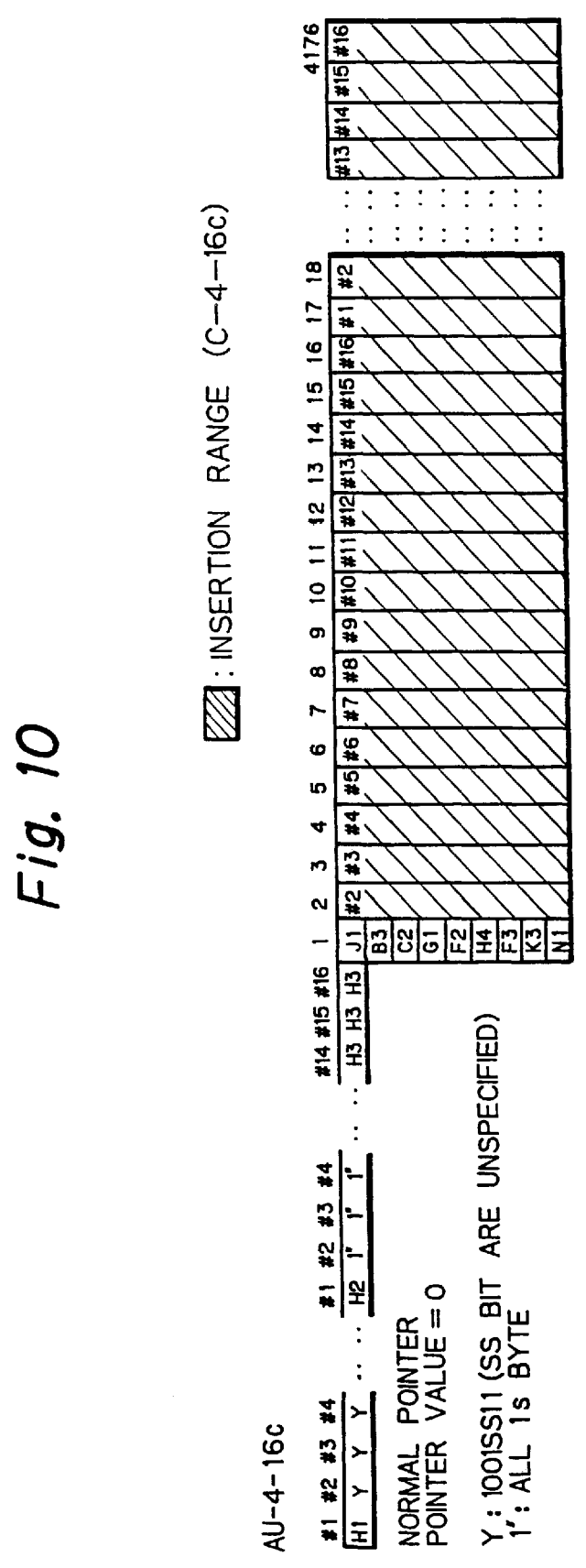

In the foregoing case, the path test circuits in the frame processors 310 and 550 which are each implemented in the form of an LSI logic chips can freely generate the PN patterns intermittently to be suspended at any test section in response to the control signal fed from the intra-equipment frame counter 18. This enables the continuous PN pattern to be effectively inserted into or extracted from the rows of the containers C-4's in the frames obtained by dividing the synchronous transport module STM-16. Furthermore, since the transmitting side transmission equipment 300 inserts the predetermined logical value continuously into locations in which the PN pattern has not been inserted, the post stage path overhead insertion circuit 22 can freely insert the path overhead POH and the fixed stuff if necessary. This enables the first frame processor 310 to insert the path overhead POH of the virtual container VC-4-16c, and the remaining frame processors 310 to insert only the PN pattern. This makes it possible to generate the path test signal in the form of virtual container VC-4-16c as shown in FIG. 10 like that in FIG. 4, or the path test signal including an administrative unit AU-4-16c further including the additional AU pointer.

Figure 11:
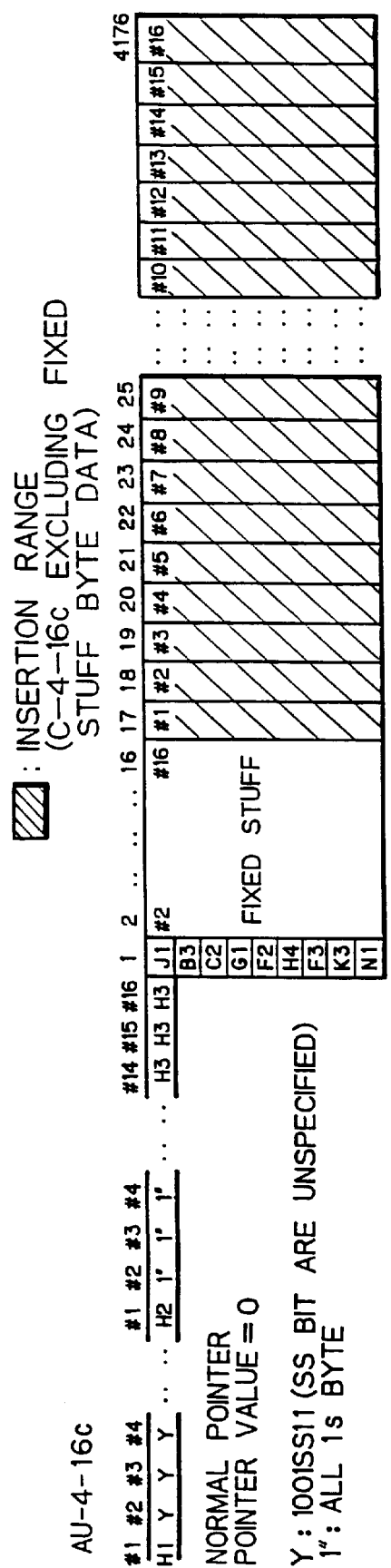
FIG. 11 illustrates, like FIG. 4, another example of the path test signal applied to the alternative embodiment.

In addition, carrying out the multiplexing with the fixed stuff inserted by the frame processors 310 other than the first frame processor 310 can construct the virtual container VC-4-16c as shown in FIG. 11 like that of FIG. 5 or the administrative unit AU-4-16c. In this case, each path overhead monitor circuit 40 in the receiving side can detect its corresponding PN pattern by an identification code inserted into the fixed stuff by each path overhead insertion circuit 22 in the transmitting side to indicate the processor 310 that inserts the PN pattern. This makes it possible to detect an error which can occur when multiplexing circuit 340 or demultiplexer 520 erroneously identifies the frame position when carrying out multiplexing or demultiplexing, which can be used for estimating the performance of the interleaving of the multiplexer and the deinterleaving of demultiplexer. More specifically, the estimation of the interleaving and deinterleaving can detect and prevent potential errors which can occur in the real information because the path overhead POH is not inserted by the frame processors 310 other than the first frame processor 310, and hence the receiving side can erroneously make a decision that the PN pattern is correct even if the second and the following frames are not correctly ordered in their positions as long as the PN pattern itself does not include an error.

Furthermore, the alternative embodiment can perform a further upstream path test because each frame processor 310 of the transmitting side transmission equipment 300 includes the path test checker. In this case, the upstream path may be a path either for transmitting the synchronous transport module STM-16 or for transmitting the synchronous transport module STM-1. In particular, since each frame processor 310 includes the path overhead monitor circuit 40 capable of processing the path overhead POH of the virtual container VC-4 in the present embodiment, the transmission error can be checked even if a switching or multiplexing system is interconnected upstream which handles a plurality of synchronous transport modules STM-1s by detecting the path overheads POHs and containers C-4 by the frame processors 310 to which the virtual containers VC-4 in the transmission frames are supplied when the synchronous transport modules STM-1s including the path test signal are sent.

Likewise, since each frame processor 550 in the receiving side transmission equipment 500 includes the path overhead insertion circuit 22 that can insert a header similar to the path overhead POH of the virtual container VC-4, the path test signal can be generated of the virtual containers VC-4 each of which includes the path overhead POH added thereto. Accordingly, it is possible to achieve the test of a plurality of paths or of a single continuous path by transmitting the path test signal through an exchange or multiplexing device, even if the switching or multiplexing system is interconnected downstream to handle multiple synchronous transport modules STM-1's. Thus, the alternative embodiment of the digital transmission system can perform the path test of the virtual container VC-4-16c in the entire system or equipment that handles the synchronous transport module STM-16 accommodating the virtual container VC-4-16c. Besides, it can carry out the path test of each synchronous transport module STM-1 accommodating the virtual container VC-4.

Although the alternative embodiment is described exemplifying the transmission of the synchronous transport module STM-16 with a rate of 16 times that of the basic interface as that of the synchronous transport module STM-N, the present invention is not limited to this, of course. For example, it is applicable to the transmission of the synchronous transport module STM-N, where N is an n-th power of two, and n is an even natural number including zero. In this case, N sets of the frame processors 310 and 550 can be provided at the transmitting side and the receiving side, respectively, so that they can operate in response to the clock signals with a rate substantially equal to or less than that of the basic interface.

In addition, although the alternative embodiment is an example in which all the component circuits are adapted to process the transmission frame in bit serial mode, they can process the transmission frame in parallel because each column of each transmission frame of the synchronous transport module STM-N consists of eight bits. This can be achieved by providing a parallel-to-serial converter at the output of the regenerator section terminating circuit 26 of the transmitting side transmission equipment 300, and a serial-to-parallel converter at the input of the regenerator section terminating circuit 32 of the receiving side transmission equipment 500. In this case, a reset type parallel PN pattern generator can be employed as the test pattern generator 20, and a parallel self-synchronous PN pattern checker can be used as the test pattern checker 42 at the receiving side. However, they must be provided with the pattern suspending circuit for freely suspending the generation of the PN pattern. This enables the component circuits in the equipment to operate on the basis of a clock signal with a still lower frequency. For example, they can operate at a frequency 19.44 MHz, ⅛ that of the synchronous transport module STM-1.

Moreover, although the alternative embodiment is described in which each of the frame processors 310 and 550 comprises the path test circuit including both the path test signal generator and path test signal checker, this is not essential. For example, the present invention can cover in its scope a digital transmission system which comprises a frame processor including only either the path test signal generator or the path test signal checker, or which comprises the frame processor including only the path test signal generator in the transmitting side transmission equipment, and the frame processor including only the path test signal checker in the receiving side transmission equipment.

According to the digital transmission system in accordance with the present invention, the test pattern generator is provided which is adapted to generate a continuous test pattern intermittently, and hold a predetermined logical value in the intervals in which the test pattern is suspended so that the logical value is inserted into the predetermined locations in the transmission frame, thereby inserting the continuous test pattern into the entire columns of at least the payload in the virtual container accommodated in the transmission frame. This makes it possible to generate the path test signal in which the test pattern is effectively inserted into the payload of the synchronous transport module STM-N having a higher order than the basic interface, and to achieve the effective test of a transmission path that transmits the synchronous transport module STM-N. In addition, since the path overhead and section overhead are overwritten on the locations in which the predetermined logical value is inserted, the relative location of the test pattern can be maintained with respect to those locations. This makes it possible to generate the synchronous transport module containing the correct test pattern.

Furthermore, the receiving side transmission equipment can achieve the check of the path test signal by generating the continuous test pattern corresponding to that of the transmitting side with freely interposing the suspended intervals to extract the received test pattern correctly.

Moreover, the digital transmission system including the multiple path test signal generators and path test signal checkers enables its component circuits to operate at a frequency equal to or less than the frequency of the basic interface, enables the information to be multiplexed with byte interleaving and to be demultiplexed with byte deinterleaving, and enables the path test signal to be inserted into and extracted from the higher order synchronous transport module. This makes it possible to achieve the effective path test. In this case, the component circuits operating at the frequency equal to or lower than that of the basic interface can be fabricated in the form of an LSI. This offers an advantage of constructing a small and inexpensive system.

The entire disclosure of Japanese patent application No. 341298/1996 filed on Dec. 20, 1996, including the specification, claims, accompanying drawings and abstract of the disclosure, is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A digital transmission system for transmitting between transmission equipment transmission frames with an order higher than that of a transmission frame of a basic interface of a synchronous digital hierarchy, said digital transmission system comprising at least in a transmitting side transmission equipment:

a first pointer processing circuit generating, a pointer indicating a start position of a virtual container accommodated in each transmission frame in response to an intra-equipment clock signal and a receiving clock signal;

a first intra-equipment frame counter detecting a position of each transmission frame in the equipment in response to the intra-equipment clock signal, and sending out a control signal indicating the detected position;

a test pattern generating circuit generating a maximum length sequence pseudo-random number (PN) pattern as a test pattern, and inserting the test pattern in a predetermined position of the transmission frame in response to the control signal from said first intra-equipment frame counter;

a path overhead generating circuit generating a path overhead that manages a path, and inserting the path overhead at a predetermined position in the transmission frame into which the test pattern has been inserted in response to the control signal from the first intra-equipment frame counter; and a section overhead generating circuit generating a section overhead that manages a section and inserting the section overhead at a position of the transmission frame into which the test pattern and the path overhead have been inserted in response to the control signal from the first intra-equipment frame counter, wherein said test pattern generating circuit generates a continuous test pattern, outputs said continuous test pattern intermittently, inserts the output continuous test pattern into each row of at least a payload of the virtual container accommodated in the transmission frame and inserts a predetermined logical value into predetermined intervals where output of the test signal is suspended, and wherein said path overhead generating circuit and said section overhead generating circuit assemble the transmission frame with a predetermined format by overwriting overheads on the intervals in which the predetermined logical value has been inserted by said test pattern generating circuit.

2. The digital transmission system in accordance with claim 1, wherein said digital transmission system further comprises at least in a receiving side transmission equipment:

a section overhead processing circuit receiving the transmission frame from a channel and detecting the section overhead of said received transmission frame to perform predetermined processing on the section overhead;

a second pointer processing circuit relocating synchronization of said received transmission frame from a receiving clock signal to an intra-equipment clock signal by replacing the pointer of the received transmission frame;

a second intra-equipment frame counter detecting a position of each said received transmission frame in the equipment in response to the intra-equipment clock signal and sending out a control signal indicating the position of said each received transmission frame;

a path overhead monitoring circuit detecting the path overhead of said each received transmission frame fed through said second pointer processing circuit and monitoring a content of said path overhead; and a test pattern check circuit detecting a test pattern of said each received transmission frame in response to the control signal from said intra-equipment frame counter and checking whether the test pattern includes a transmission error, wherein said test pattern check circuit intermittently outputs, in response to the control signal from said intra-equipment frame counter, a continuously generated test pattern corresponding to said test pattern generated by said test pattern generating circuit and checks for a transmission error at least of said payload in the virtual container accommodated in the received transmission frame by comparing said payload with the continuously generated test pattern generated by said test pattern check circuit.

3. The digital transmission system in accordance with claim 2, wherein said transmitting side transmission equipment comprises a first parallel-to-serial converting circuit converting the transmission frame which has been processed in byte parallel into a bit-serial transmission frame to be transmitted, and said receiving side transmission equipment comprises a first serial-to-parallel converting circuit converting the bit serial transmission frame to a byte-parallel transmission frame to be processed in byte parallel.

4. The digital transmission system in accordance with claim 2, wherein said basic interface is a transmission frame of a synchronous transport module level 1 with a rate of 155.52 Mbps, and the higher order transmission frame is a transmission frame with a rate of an n-th power of two times the rate of the synchronous transport module level 1, where n is an even integer including zero, said higher order transmission frame accommodating a container C-4-Xc with an order higher than at least that of a fourth order container C-4, where Xc is an n-th power of 2, wherein said transmitting side transmission equipment generates a virtual container VC-4-Xc for a test including the container C-4-Xc into which the test pattern is inserted, said virtual container VC-4-Xc being generated by said test pattern generating circuit and said path overhead generating circuit, and wherein said receiving side transmission system detects entire transmission errors of the virtual container VC-4-Xc for the test by said path overhead monitoring circuit and said test pattern check circuit.

5. The digital transmission system in accordance with claim 4, wherein said virtual container VC-4-Xc includes a 9-row by 1-column path overhead and 9-row by (Xc−1)-column fixed stuff and a 9-row by 260Xc-column payload, and wherein said test pattern generating circuit suspends generation of the test pattern at least at positions of the path overhead and fixed stuff and inserts the predetermined logical value into said positions, and said path overhead generating circuit generates the path overhead including the fixed stuff, and inserts them in the positions, into which the predetermined logical value has been inserted, by overwriting said path overhead and fixed stuff.

6. The digital transmission system in accordance with claim 4, wherein said digital transmission system comprises at least in the transmitting side transmission equipment a plurality of path test signal generators each including a first pointer processing circuit, a first intra-equipment frame counter, a test pattern generating circuit and a path overhead generating circuit, and wherein each of said path test signal generators, operating at a clock frequency equal to or lower than that of the basic interface, generates the virtual container VC-4-Xc for the test by multiplexing, with byte interleaving, virtual containers including containers into which the test patterns from corresponding ones of said path test signal generators are inserted.

7. The digital transmission system in accordance with claim 6, wherein said transmitting side transmission equipment comprises:

a second parallel-to-serial converting circuit converting each transmission frame which has been processed in byte parallel into a bit-serial transmission frame to be transmitted; and a multiplexing circuit for multiplexing signals output from said second parallel-to-serial converting circuit, and wherein said receiving side transmission equipment comprises:

a demultiplexing circuit for dividing the transmission frame transmitted in bit serial into a plurality of frames, and a second serial-to-parallel converting circuit for converting the divided frames to byte-parallel frames to be processed in byte parallel.

8. The digital transmission system in accordance with claim 4, wherein said digital transmission system comprises at least in said receiving side transmission equipment a plurality of path test signal checkers each including a second pointer processing circuit, a second intra-equipment frame counter, a path overhead monitoring circuit and said test pattern check circuit, and wherein each of said path test signal checkers, operating at a clock frequency equal to or lower than that of the basic interface, processes the path test signal obtained by dividing the virtual container VC-4-Xc from a channel by demultiplexing it.

9. The digital transmission system in accordance with claim 4, wherein said digital transmission system comprises in each said transmission equipment a plurality of path test circuits, each of which includes first and second intra-equipment frame counters, a test pattern generating circuit, a path overhead generating circuit, first and second pointer processing circuits, a path overhead monitoring circuit and a test pattern check circuit, and processes the virtual container VC-4-Xc including the container C-4-Xc, into which the test pattern is inserted, while operating at a clock frequency equal to or lower than that of the basic interface.

10. A path test signal generator in synchronous transmission equipment for inserting, when generating and transmitting a transmission frame with an order higher than that of a transmission frame of a basic interface in a synchronous digital hierarchy, a path test signal into a container accommodated in the transmission frame, said path test signal generator comprising:

an intra-equipment frame counter detecting a position of each transmission frame in the equipment in response to an intra-equipment clock, and sending out a control signal indicating that detected position;

a test pattern generating circuit generating a maximum length sequence pseudo-random number (PN) pattern as a test pattern, and inserting the test pattern in a predetermined position of said each transmission frame in response to the control signal from said intra-equipment frame counter; and a path overhead generating circuit generating a path overhead that manages a path and inserting the path overhead at a predetermined position in the transmission frame into which the test pattern has been inserted in response to the control signal from the intra-equipment frame counter.

11. The path test signal generator in accordance with claim 10, wherein said test pattern generating circuit generates a continuous test pattern, outputs said continuous test pattern intermittently, inserts a predetermined logical value at intervals in the transmission frame during which output of the test pattern is suspended, and inserts the output continuous test pattern in each row of at least a payload of a virtual container accommodated in the transmission frame.

12. The path test signal generator in accordance with claim 11, wherein said virtual container consists of a higher order virtual container VC-4-Xc formed by concatenating a plurality of fourth order group virtual containers VC-4, where Xc is the n-th power of two, and n is an even number including zero, and wherein said virtual container VC-4-Xc includes a 9-row by 1-column path overhead, 9-row by (Xc−1)-column fixed stuff, and a 9-row by 260Xc-column payload.

13. The path test signal generator in accordance with claim 12, wherein said test pattern generating circuit suspends generating the test pattern at least at positions of the path overhead and fixed stuff, and inserts a predetermined logical value in those positions as provisional path overhead and fixed stuff, and wherein said path overhead generating circuit generates path overhead and fixed stuff, and overwrites the path overhead and fixed stuff at the positions into which the provisional path overhead and fixed stuff have been inserted.

14. The path test signal generator in accordance with claim 10, wherein said path overhead generating circuit rewrites the path overhead by overwriting it in the intervals in which the predetermined logical value has been inserted by said test pattern generating circuit.

15. The path test signal generator in accordance with claim 10, wherein said test pattern generating circuit includes a reset type serial PN pattern generator.

16. The path test signal generator in accordance with claim 10, wherein said test pattern generating circuit includes a serial self-synchronous PN pattern generator.

17. The path test signal generator in accordance with claim 10, wherein said test pattern generating circuit includes a reset type parallel PN pattern generator.

18. A path test signal checker in synchronous transmission equipment for receiving through a channel a transmission frame with an order higher than that of a transmission frame of a basic interface of a synchronous digital hierarchy, and checking a path test signal inserted into a virtual container of the transmission frame, said path test signal checker comprising:

a pointer processing circuit relocating synchronization of the transmission frame from a receiving clock signal to an intra-equipment clock signal by replacing a pointer of the received transmission frame;

an intra-equipment frame counter detecting a position of each transmission frame in the equipment in response to the intra-equipment clock signal, and for sending out a control signal indicating that detected position;

a path overhead monitoring circuit monitoring a content of a path overhead by detecting the path overhead of the transmission frame fed through said pointer processing circuit in response to the control signal from said intra-equipment frame counter; and a test pattern check circuit checking a test pattern for a transmission error by detecting the test pattern of the transmission frame fed through said pointer processing circuit in response to the control signal from said intra-equipment frame counter.

19. The path test signal checker in accordance with claim 18, wherein said test pattern check circuit intermittently generates, in response to the control signal delivered from said intra-equipment frame counter, a test pattern corresponding to the test pattern inserted in predetermined portions of said transmission frame and checks for transmission errors at least of a payload of the virtual container accommodated in the received transmission frame in accordance with the test pattern generated by said test pattern check circuit.

20. The path test signal checker in accordance with claim 19, wherein said virtual container consists of a higher order virtual container VC-4-Xc formed by concatenating a plurality of fourth order group virtual containers VC-4, where Xc is the n-th power of two, and n is an even number including zero, and wherein said virtual container VC-4-Xc includes a 9-row by 1-column path overhead, 9-row by (Xc−1)-column fixed stuff, and a 9-row by 260Xc-column payload.

21. The path test signal checker in accordance with claim 20, wherein said path overhead monitoring circuit detects the path overhead and the fixed stuff, and carries out error detection of them.

22. The path test signal checker in accordance with claim 18, wherein said test pattern check circuit includes a serial self-synchronous PN pattern check circuit for serially generating a maximum length sequence PN pattern, and checks the test pattern.

23. The path test signal checker in accordance with claim 18, wherein said test pattern check circuit includes a parallel self-synchronous PN pattern checking circuit for generating in parallel a maximum length sequence PN pattern, and checks the test pattern.

* * * * *